US012793220B2

(12) United States Patent
Pokkalla et al.

(10) Patent No.: US 12,793,220 B2
(45) Date of Patent: Nov. 10, 2026

(54) MULTI-RESOLUTION FOUNDATION MODEL FOR PATHOLOGY

(71) Applicant: PathAI, Inc., Boston, MA (US)

(72) Inventors: Harsha Vardhan Pokkalla, Sudbury, MA (US); Sean Grullon, Philadelphia, PA (US); Dinkar Juyal, San Francisco, CA (US); Harshith Padigela, Medford, MA (US); Chintan Shah, Woburn, MA (US); Syed Ashar Javed, Snohomish, WA (US); Daniel Shenker, Cambridge, MA (US); Natalia Harguindeguy Gerona, Berkeley, CA (US); Yi Liu, Newton, MA (US); Blake Martin, Canton, MI (US); Yibo Zhang, Lynnfield, MA (US); Michael Nercessian, Berkeley, CA (US); John Abel, Somerville, MA (US); Benjamin P. Glass, Boston, MA (US); Andrew H. Beck, Brookline, MA (US)

(73) Assignee: PathAI, Inc., Boston, MA (US)

( * ) Notice: Subject to any disclaimer, the term of this patent is extended or adjusted under 35 U.S.C. 154(b) by 0 days.

(21) Appl. No.: 19/188,471

(22) Filed: Apr. 24, 2025

(65) Prior Publication Data

US 2025/0336065 A1 Oct. 30, 2025

Related U.S. Application Data

(60) Provisional application No. 63/638,624, filed on Apr. 25, 2024.

(51) Int. Cl.
*G06T 7/00* (2017.01)

(52) U.S. Cl.
CPC .. *G06T 7/0012* (2013.01); *G06T 2207/10056* (2013.01); *G06T 2207/20056* (2013.01);
(Continued)

(58) Field of Classification Search
CPC ......... G06T 7/0012; G06T 2207/10056; G06T 2207/20056; G06T 2207/20081;
(Continued)

(56) References Cited

U.S. PATENT DOCUMENTS

| | | | | |
|---|---|---|---|---|
| 11,756,198 | B1 | 9/2023 | Beck et al. | |
| 12,045,961 | B2 * | 7/2024 | Li | G06T 5/60 |

(Continued)

FOREIGN PATENT DOCUMENTS

| | | | |
|---|---|---|---|
| EP | 4 345 353 | A1 | 4/2024 |
| EP | 4 354 353 | A1 | 4/2024 |
| WO | WO 2023/164051 | A1 | 8/2023 |

OTHER PUBLICATIONS

International Search Report and Written Opinion dated Jul. 30, 2025, in connection with International Application No. PCT/US2025/026155.

(Continued)

*Primary Examiner* — Michael S Osinski
(74) *Attorney, Agent, or Firm* — Wolf, Greenfield & Sacks, P.C.

(57) ABSTRACT

In some aspects, a method, a system, or a non-transitory computer-readable storage medium are described for a foundation model for use in pathology, by providing an input dataset representing a plurality of pathology images as input to a backbone of the foundation model, wherein the plurality of pathology images comprises patches having different levels of pixel resolution; producing, with the backbone of the foundation model, a plurality of vector embeddings based on the input dataset; adjusting weights associated with the backbone of the foundation model based on the plurality of vector embeddings by using a Fourier reconstruction loss function configured to separate portions of the patches in accordance with a high-frequency band and a low-frequency (Continued)

band; and storing the foundation model on at least one storage device.

7 Claims, 22 Drawing Sheets

(52) U.S. Cl.
CPC ............... *G06T 2207/20081* (2013.01); *G06T 2207/30024* (2013.01); *G06T 2207/30068* (2013.01)

(58) Field of Classification Search
CPC . G06T 2207/30024; G06T 2207/30068; G06T 2207/20084; G06T 2207/30096; G06T 2207/20021; G06T 2207/10024; G06T 2207/30168; G06T 3/4046; G06T 7/0002; G06T 7/0016; G06T 7/11; G16H 50/20; G16H 30/40; G06V 10/764; G06V 10/82; G06V 2201/03; G06V 10/774; G06N 3/045; G06N 3/0464; G06N 3/08
See application file for complete search history.

(56) References Cited

U.S. PATENT DOCUMENTS

| | | | | |
|---|---|---|---|---|
| 12,159,384 | B2 * | 12/2024 | Song | G06F 18/214 |
| 12,450,927 | B2 * | 10/2025 | Roessler | G06V 20/698 |
| 12,602,743 | B1 * | 4/2026 | Xu | G06F 7/57 |
| 2016/0253466 | A1 | 9/2016 | Agaian et al. | |
| 2019/0273509 | A1 * | 9/2019 | Elkind | G06F 21/562 |
| 2021/0089807 | A1 * | 3/2021 | Liu | G06V 20/70 |
| 2021/0383534 | A1 * | 12/2021 | Tadross | G06V 10/82 |
| 2023/0169647 | A1 * | 6/2023 | Aisaka | G06T 7/0012<br>382/128 |
| 2023/0259787 | A1 | 8/2023 | David | |
| 2023/0260125 | A1 * | 8/2023 | Ianni | G06T 7/0012<br>382/128 |
| 2023/0274534 | A1 * | 8/2023 | Aichert | G06T 7/11<br>382/128 |
| 2023/0281755 | A1 * | 9/2023 | Yang | G06N 3/04<br>382/100 |
| 2023/0342930 | A1 * | 10/2023 | Reunanen | G06T 7/0002 |
| 2023/0386610 | A1 | 11/2023 | Singh et al. | |
| 2024/0135677 | A1 * | 4/2024 | Chen | G06V 10/267 |
| 2024/0177838 | A1 | 5/2024 | Liu et al. | |
| 2024/0212189 | A1 * | 6/2024 | Cavallari | G06V 10/82 |
| 2024/0281981 | A1 * | 8/2024 | Arbelo-Gonzalez | G06T 15/00 |
| 2024/0331364 | A1 * | 10/2024 | Kwak | G06N 3/04 |
| 2025/0037238 | A1 * | 1/2025 | Kulikov | G06N 3/045 |
| 2025/0037272 | A1 * | 1/2025 | Aggarwal | G16H 50/20 |
| 2025/0182280 | A1 * | 6/2025 | Gaire | G06F 3/0481 |
| 2026/0012617 | A1 * | 1/2026 | Garus | H04N 19/11 |
| 2026/0030745 | A1 * | 1/2026 | Braman | G06T 7/0012 |
| 2026/0057523 | A1 * | 2/2026 | Ianni | G06T 7/0012 |
| 2026/0057968 | A1 * | 2/2026 | Rhodes | G16B 40/20 |
| 2026/0148838 | A1 * | 5/2026 | Zhao | G16H 30/40 |

OTHER PUBLICATIONS

Aben et al., Towards large-scale training of pathology foundation models. ArXiv preprint. Mar. 2, 20244.
Yeh et al., Toward a foundation model for time series data. Proceedings of the 32 ACM International Conference on Information and Knowledge Management. 2023. 19 Pages.
Abel et al., Deep-learning quantified cell-type-specific nuclear morphology predicts genomic instability and prognosis in multiple cancer types. bioRxiv. Mar. 12, 2024. DOI:https://doi.org/10.1101/2023.05.15.539600. 51 Pages.
Bandi et al., From Detection of Individual Metastases to Classification of Lymph Node Status at the Patient Level: The CAMELYON17 Challenge. IEEE Transactions on Medical Imaging. Feb. 2019;38(2):550-60.
Bao et al., Contextual Vision Transformers for Robust Representation Learning. arXiv preprint arXIV:2305.19402. Sep. 28, 2022.
Bensaid et al., A Novel Benchmark for Few-Shot Semantic Segmentation in the Era of Foundation Models. Translations on Machine Learning Research. arXiv:2401.11311. Jun. 3, 2025. 26 Pages.
Beyer et al., FlexiVit:One Model for All Patch Sizes. IEEE/CVF Conference on Computer Vision and Pattern Recognition (CVPR). arXiv:2212.08013. Mar. 23, 2023. 11 Pages.
Bommasani et al., On the Opportunities and Risks of Foundation Models. arXiv:2018.07258. Jul. 12, 2022. 214 Pages.
Bosch et al., A machine Learning Approach to Liver Histological Evaluation Predicts Clinically Significant Portal Hypertension in NASH Cirrhosis. *Hepatology.* 2021. 74(6):3146-60.
Bulten et al., Automated deep-learning system for Gleason grading of prostate cancer using biopsies: a diagnostic study. *The Lancet Oncology.* Feb. 2020. 21(2):233-41.
Campanella et al., Clinical-grade computational pathology using weakly supervised deep learning on whole slide images. Nature Medicine. Aug. 2019. 25:1301-9.
Caron et al., Emerging Properties in Self-Supervised Vision Transformers. arXiv:2104.14294. May 24, 2021. 21 Pages.
Chen et al., Scaling Vision Transformers to Gigapixel Images via Hierarchical Self-Supervised Learning. In *Proceedings of the IEEE/CVF Conference on Computer Vision and Pattern Recognition (CVPR)* arXiv:2206.02647. 2022. 16144-16155.
Chen et al., Towards a general-purpose foundation model for computational pathology. Nature Medicine. Mar. 2024. 30:850-62.
Dippel et al., RudolfV: A Foundation Model by Pathologists for Pathologists. arXiv:2401.04079v4. Jun. 11, 2024. 17 Pages.
Filiot et al., Scaling Self-Supervised Learning for Histopathology with Masked Image Modeling. medRxiv. Jul. 21, 2023. 20 Pages.
Kang et al., Benchmarking Self-Supervised Learning on Diverse Pathology Datasets. arXiv:2212.04690v2. Apr. 18, 2023. 18 Pages.
Vorontsov et al., Virchow: A Million-Slide Digital Pathology Foundation Model. arXiv:2309.07778. Jan. 18, 2024. 21 Pages.

* cited by examiner

| Method | Camelyon16 | | TCGA NSCLC | | TCGA RCC | |
|---|---|---|---|---|---|---|
| | Accuracy | AUC | Accuracy | AUC | Accuracy | AUC |
| Mean Pooling MIL | 0.751 | 0.707 | 0.830 | 0.925 | 0.918 | 0.980 |
| Mean Pooling MIL + Additive | 0.734 | 0.687 | 0.866 | 0.924 | 0.902 | 0.974 |
| Attention MIL [ABMIL] | 0.773 | 0.750 | 0.883 | 0.946 | 0.878 | 0.978 |
| Attention MIL + Additive | 0.830 | 0.846 | 0.886 | 0.941 | 0.915 | 0.983 |
| TransMIL | 0.805 | 0.775 | 0.878 | 0.932 | 0.915 | 0.983 |
| TransMIL + Additive | 0.805 | 0.844 | 0.895 | 0.934 | 0.911 | 0.986 |

FIG. 11

MULTI-RESOLUTION FOUNDATION MODEL FOR PATHOLOGY

CROSS REFERENCE TO RELATED APPLICATIONS

This application claims priority under 35 U.S.C. § 119(e) to U.S. Provisional Patent Application Ser. No. 63/638,624, entitled "MULTI-RESOLUTION FOUNDATION MODEL FOR PATHOLOGY" filed Apr. 25, 2024, which is hereby incorporated by reference in its entirety.

BACKGROUND

Pathology as a medical discipline is instrumental in providing diagnostic and prognostic information to clinicians and patients. In a pathology workflow, biopsies of surgical tissue specimens are collected, stained, and fixed for microscopy. Microscopic analysis of the tissue is used to establish a diagnosis, estimate disease severity, and identify relevant clinical features for treatment.

The practice of pathology is not inherently digital; traditionally, pathology slides are manually examined under a microscope. Microscopy slides are increasingly being digitized in their entirety via slide scanning, generating digital whole slide images ("WSIs" or"slides"). While WSIs provide a wealth of information about a specimen to trained readers such as pathologists, the images themselves are enormous. Each WSI contains up to millions of cells and can be gigapixels in scale, making an exhaustive quantitative manual analysis of WSIs nearly impossible.

SUMMARY

According to one embodiment, a method for training a foundation model for use in pathology, is provided, the method comprising: using a computer hardware processor to perform: providing an input dataset representing a plurality of pathology images as input to a backbone of the foundation model, wherein the plurality of pathology images comprises patches having different levels of pixel resolution; producing, with the backbone of the foundation model, a plurality of vector embeddings based on the input dataset; adjusting weights associated with the backbone of the foundation model based on the plurality of vector embeddings by using a Fourier reconstruction loss function configured to separate portions of the patches in accordance with a high-frequency band and a low-frequency band; and storing the foundation model on at least one storage device.

In some embodiments, the plurality of pathology images are unlabeled such that training the foundation model is performed in an unsupervised fashion.

In some embodiments, the patches have at least first and second levels of pixel resolution, wherein: the first level of pixel resolution is between 0.25 microns per pixel (mpp) and 1 mpp, and the second level of pixel resolution is between 1 mpp and 2 mpp.

In some embodiments, the plurality of pathology images comprises images of multiple different organs.

In some embodiments, the plurality of pathology images comprises images associated with multiple different diseases.

In some embodiments, the plurality of pathology images comprises images having different types of stains.

In some embodiments, the plurality of pathology images comprises images produced with different types of scanners.

In some embodiments, the plurality of pathology images comprises images produced with different levels of objective magnification.

In some embodiments, the backbone of the foundation model comprises a Flexible Vision Transformer (FlexiViT) backbone.

In some embodiments, producing the plurality of vector embeddings comprises training the FlexiVit backbone in accordance with a DINOv2 framework.

In some embodiments, the plurality of pathology images comprises at least one pathology image having a first patch having a first level of pixel resolution and a second patch having a second level of pixel resolution different from the first level of pixel resolution.

In some embodiments, the plurality of pathology images comprises a first pathology image having at least one patch having a first level of pixel resolution and a second pathology image having at least one patch having a second level of pixel resolution different from the first level of pixel resolution.

In some embodiments, the input dataset comprises a plurality of images comprising cropped portions of pathology images, the cropped portions of pathology images comprising cropped portions of a first size and cropped portions of a second size, smaller than the first size.

In some embodiments, the method further comprises: applying masks to images of the input dataset; passing a first plurality of masked images of the input data set to a first encoder of the backbone; passing a second plurality of masked images of the input data set to a second encoder of the backbone, the second plurality of masked images being smaller than the images of the first plurality of masked images, wherein producing the plurality of vector embeddings comprises producing vector embeddings using the first and second pluralities of masked images using the first and second encoders; reconstructing, based on the vector embeddings produced by the first and second encoders, masked portions of masked images of the input data set; adjusting the weights associated with the backbone of the foundation model based on a loss function determined from the reconstructed masked portions.

In some embodiments, the reconstructing comprises generating reconstructed pathology images; and the Fourier loss function is based on patches in the reconstructed pathology images.

In some embodiments, the method further comprises fine-tuning an adaptation head of the foundational model, to perform one or more of: slide-level identification of biological features, tissue-level identification of biological feature, cellular-level identification of biological features, and/or subcellular-level identification of biological features, the fine tuning comprising: inputting a fine-tuning dataset comprising a plurality of pathology images to the backbone; and fine-tuning the adaptation head using vector embeddings generated by the backbone using the fine-tuning dataset.

According to one embodiment, at least one non-transitory computer-readable storage medium, storing processor executable instructions, that when executed by at least one computer hardware processor cause the processor to perform a method for training a foundation model for use in pathology, is provided, the method comprising: providing an input dataset representing a plurality of pathology images as input to a backbone of the foundation model, wherein the plurality of pathology images comprises patches having different levels of pixel resolution; producing, with the backbone of the foundation model, a plurality of vector embeddings based on the input dataset; adjusting weights associated with the backbone of the foundation model based on the plurality of vector embeddings by using a Fourier reconstruction loss function configured to separate portions of the patches in accordance with a high-frequency band and a low-frequency band; and storing the foundation model on at least one storage device.

According to one embodiment, a system is provided, the system comprising: a computer hardware processor; and at least one non-transitory computer-readable storage medium, storing processor executable instructions, that when executed by the at least one computer hardware processor cause the processor to perform a method for training a foundation model for use in pathology, the method comprising: providing an input dataset representing a plurality of pathology images as input to a backbone of the foundation model, wherein the plurality of pathology images comprises patches having different levels of pixel resolution; producing, with the backbone of the foundation model, a plurality of vector embeddings based on the input dataset; adjusting weights associated with the backbone of the foundation model based on the plurality of vector embeddings by using a Fourier reconstruction loss function configured to separate portions of the patches in accordance with a high-frequency band and a low-frequency band; and storing the foundation model on at least one storage device.

According to one embodiment, a method for performing pathology using a foundation model having a backbone and an adaptation head, is provided, the method comprising: using a computer hardware processor to perform: obtaining one of more input pathology images; providing the one or more input pathology images to the backbone of the foundation model; obtaining, from the backbone of the foundation model, a plurality of vector embeddings generated from the one or more input pathology images, wherein the backbone of the foundation model is pre-trained with an input dataset representing a plurality of pathology images, the plurality of pathology images comprising patches having different levels of pixel resolution; and providing the plurality of vector embeddings of the one or more input pathology images as input to the adaptation head of the foundation model; and using the foundation model to perform a pathology-related task based on at least a subset of the plurality of vector embeddings.

In some embodiments, the plurality of vector embeddings represent portions of the one or more input pathology images having different levels of pixel resolution.

In some embodiments, wherein the adaptation head of the foundation model is trained using data representing image annotations obtained from pathologists.

In some embodiments, the adaptation head of the foundation model comprises a Multiple Instance Learning (MIL) model.

In some embodiments, the adaptation head of the foundation model comprises an Additive MIL classifier.

In some embodiments, the one or more input pathology images comprise IHC-stained breast cancer slides and perform the pathology-related task comprises performing quantification of an HER2 biomarker in the IHC-stained breast cancer slides.

In some embodiments, the one or more input pathology images comprise non-small cell lung carcinoma (NSCLC) H&E-stained WSIs and perform the pathology-related task comprises performing prediction of either Adenocarcinoma or Squamous cell carcinoma in the NSCLC H&E-stained WSIs.

According to one embodiment, a system for pathology analysis is provided, the system comprising: at least one computer hardware processor; and at least one non-transitory computer-readable storage medium, storing processor executable instructions, that when executed by the at least one computer hardware processor cause the processor to perform a method for pathology analysis using a foundation model having a backbone and an adaptation head, the method comprising: obtaining one of more input pathology images; providing the one or more input pathology images to the backbone of the foundation model; obtaining, from the backbone of the foundation model, a plurality of vector embeddings generated from the one or more input pathology images, wherein the backbone of the foundation model is pre-trained with an input dataset representing a plurality of pathology images, the plurality of pathology images comprising patches having different levels of pixel resolution; providing the plurality of vector embeddings of the one or more input pathology images as input to the adaptation head of the foundation model; and using the foundation model to perform a pathology-related task based on at least a subset of the plurality of vector embeddings.

In some embodiments, the plurality of vector embeddings represent portions of the one or more input pathology images having different levels of pixel resolution.

In some embodiments, the adaptation head of the foundation model is trained using data representing image annotations obtained from pathologists.

In some embodiments, the adaptation head of the foundation model comprises a Multiple Instance Learning (MIL) model.

In some embodiments, the adaptation head of the foundation model comprises an Additive MIL classifier.

In some embodiments, the one or more input pathology images comprise IHC-stained breast cancer slides and perform the pathology-related task comprises performing quantification of an HER2 biomarker in the IHC-stained breast cancer slides.

In some embodiments, the one or more input pathology images comprise non-small cell lung carcinoma (NSCLC) H&E-stained WSIs and perform the pathology-related task comprises performing prediction of either Adenocarcinoma or Squamous cell carcinoma in the NSCLC H&E-stained WSIs.

According to one embodiment, at least one non-transitory computer-readable storage medium, storing processor executable instructions, that when executed by at least one computer hardware processor cause the processor to perform a method for pathology analysis using a foundation model having a backbone and an adaptation head, is provided, the method comprising: obtaining one of more input pathology images; providing the one or more input pathology images to the backbone of the foundation model; obtaining, from the backbone of the foundation model, a plurality of vector embeddings generated from the one or more input pathology images, wherein the backbone of the foundation model is pre-trained with an input dataset representing a plurality of pathology images, the plurality of pathology images comprising patches having different levels of pixel resolution; providing the plurality of vector embeddings of the one or more input pathology images as input to the adaptation head of the foundation model; and using the foundation model to perform a pathology-related task based on at least a subset of the plurality of vector embeddings.

In some embodiments, the plurality of vector embeddings represent portions of the one or more input pathology images having different levels of pixel resolution.

In some embodiments, the adaptation head of the foundation model is trained using data representing image annotations obtained from pathologists.

In some embodiments, the adaptation head of the foundation model comprises a Multiple Instance Learning (MIL) model.

In some embodiments, the one or more input pathology images comprise IHC-stained breast cancer slides and perform the pathology-related task comprises performing quantification of an HER2 biomarker in the IHC-stained breast cancer slides.

In some embodiments, the one or more input pathology images comprise non-small cell lung carcinoma (NSCLC) H&E-stained WSIs and perform the pathology-related task comprises performing prediction of either Adenocarcinoma or Squamous cell carcinoma in the NSCLC H&E-stained WSIs.

BRIEF DESCRIPTION OF THE DRAWINGS

The figures are provided for the purposes of illustration and explanation and are not intended as a definition of the limits of the systems and methods described herein. In the figures:

FIG. 11 is a table showing how additive MIL models can achieve comparable or superior performance to the standard attention MIL model, in accordance with some embodiments.

DETAILED DESCRIPTION

I. Overview

Figure 1:
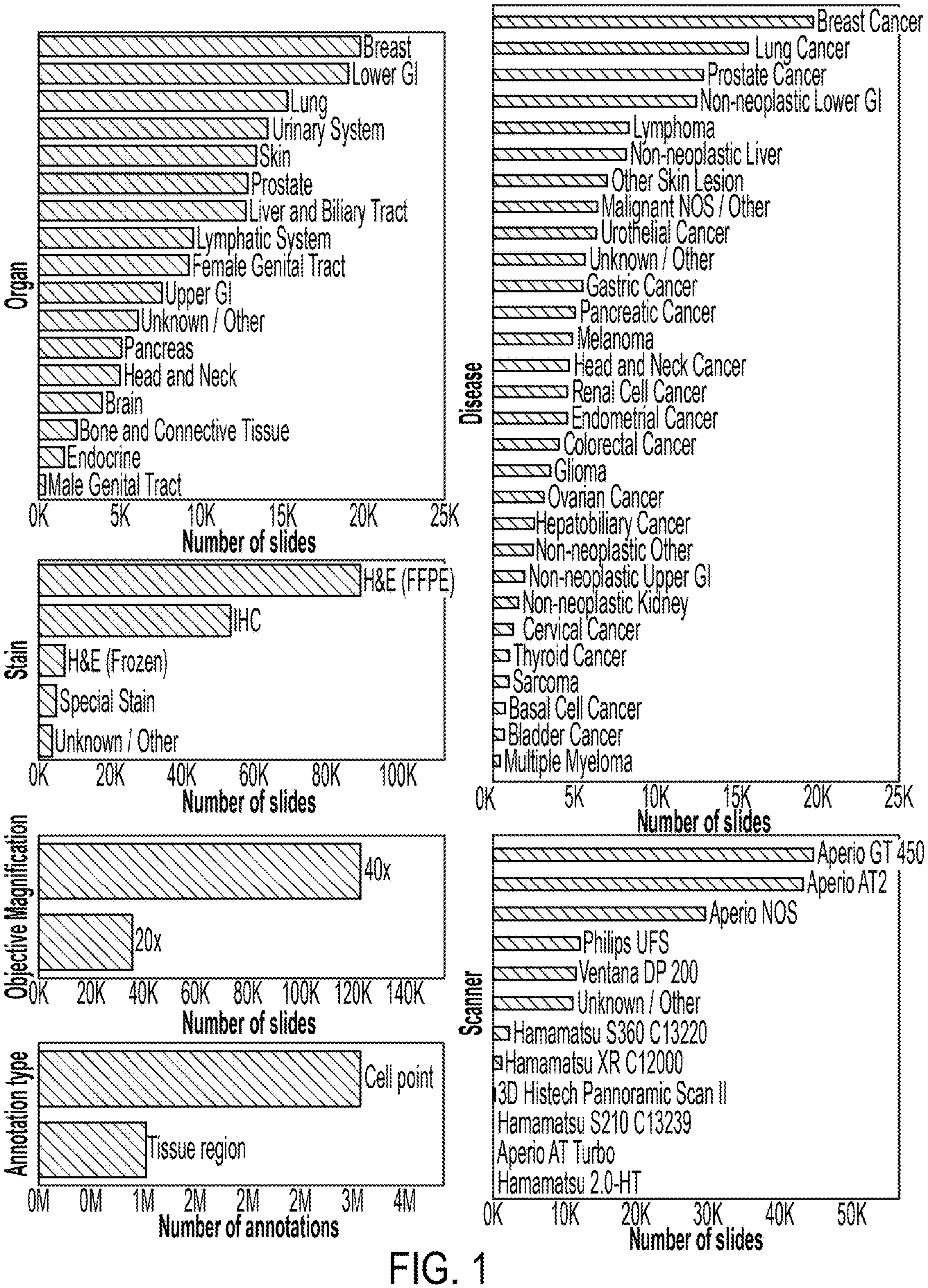
FIG. 1 illustrates distribution of a pre-training dataset by organ, disease, stain, scanner, annotation type and objective magnification, in accordance with some embodiments.

Described herein are foundation models designed to account for the unique characteristics of pathology images and to enable a diversity of down-stream pathology tasks. As described in detail further below, foundation models of the types described herein are trained to create meaningful embeddings across different levels of image magnification, which enables the adaptation to numerous, different applications without having to re-train the backbone each time.

Artificial intelligence (AI) and machine learning (ML) techniques are well-suited for the quantitative study of these extremely large WSIs. A wide variety of ML techniques have been developed for or applied within the pathology domain, ranging from detection and characterization of microscopic biological entities within the WSI, to end-to-end frameworks for making slide-level predictions or diagnoses. The inventors have recognized and appreciated, however, that developing supervised machine learning models for pathology presents several challenges. These algorithms require large amounts of labelled data, which is often expensive to collect and, in some cases, difficult to source due to the low prevalence of disease characteristics. This is further complicated by the fact that these algorithms may only be adapted to limited tasks (e.g., a single type of slide, indications of a single disease or single group of related diseases, etc.). Additionally, these models need to be generalized across variations introduced by different source sites, scanners and staining procedures. Lowering the data burden and improving the robustness of these models is important for broad-scale adoption of AI models in pathology practice. Furthermore, the diversity of individual tasks in pathology (such as classification, segmentation, and slide-level prediction) makes training bespoke AI models from scratch challenging.

In some embodiments, it is appreciated that it may be beneficial to replace bespoke AI models conventionally used in pathology with foundation models (FMs). Foundation models are large scale deep learning models that are pre-trained on broad-scale, unlabeled data using self-supervision. Leveraging the flexible nature of foundation models, the approaches described herein can be adapted to multiple downstream tasks, such as image classification and object detection. Importantly, fewer labels are necessary for adapting foundational models for downstream tasks than is the case in traditional, strongly supervised methods. This adaptation procedure involves utilizing the representation (e.g., vector embeddings) produced by a pre-trained foundation model backbone to fine tune a task head (with significantly fewer model parameters than the backbone) on a particular downstream task.

The inventors have recognized and appreciated that conventional approaches based on foundation models have several limitations. First, these approaches predominately rely on a large amount of proprietary data from a single site, resulting in site-specific batch effects (e.g., site-specific variations, including both stain and the patient population) which reduces the robustness of AI models. Second, conventional foundation models do not leverage the multi-scale nature of WSIs, thereby limiting the applicability of these models. Finally, conventional backbones are trained with a large number of model parameters, which increases the complexity and cost of deploying these models, further limiting their practical use in routine pathology practice.

The models developed by the inventors and described herein overcome at least one or more of these limitations. These models are based on a backbone that is pre-trained on a diverse dataset from multiple sites and that extracts meaningful representations across different levels of the Whole Slide Image (WSI) pyramid (discussed in detail further below). The backbone is the primary component responsible for extracting features from the input data. This part of the model involves several layers of a neural network (or more than one neural network) that process the input data to create a representation or set of features (e.g., embeddings) that encapsulate the important information needed for further tasks. The layers may be layers of a transformer in some embodiments. Alternatively, the layers may be layers of a convolutional neural network (CNN) that process images to detect edges, textures, and other visual elements. However, other types of neural networks are possible. Unique aspects of the backbones described herein relate to the pre-training dataset, multi-scale pre-training and backbone architecture.

The inventors have appreciated that the foundation models described herein systems and techniques for processing pathology images may be improved. The models described herein require less specialized data for training and may be adapted to perform specific tasks across multiple resolutions, types and sizes of WSIs. This allows for systems and techniques for processing pathology images to be more adaptable to a wider range of tasks, without requiring large amounts of specialized and/or labeled data. Further, by pre-training foundation model backbones across various sizes and/or resolutions of WSIs, the foundation model may more accurately perform pathology tasks (e.g., using adaptation heads as described herein) on input images having different properties (e.g., resolution, size, stains, scanners, etc.).

The inventors have appreciated that the backbone of a foundation model may be pre-trained across multiple types, sizes and/or resolutions of WSIs or portions of WSIs by utilizing specialized loss functions in pre-training. The specialized loss functions may involve using pixel-level reconstruction loss associated with the use of masked autoencoders on multiple WSI patch sizes and/or Fourier reconstruction loss based on high and low frequency components of training images. These loss functions account for differences across different scales of training images and allow the backbone to be pre-trained on images with different types, sizes, and/or resolutions, and therefore process (e.g., generate vector embeddings) of images of different types, sizes and/or resolutions.

Further, the inventors have appreciated that by pre-training the backbone of the foundation model on a variety of WSI types, sizes and resolutions, the training of adaptation heads may require less data than with conventional techniques. Furthermore, systems and techniques utilizing the models described herein have improved performance when performing specific tasks (e.g., when utilizing models with an adaptation head to analyze pathology images), as the foundation models are pre-trained across many WSIs at different resolutions and levels and therefore has improved adaptation to many tasks and can handle varying input images (e.g., different sizes, resolutions, types, etc.).

A. Pre-Training Dataset

In some embodiments, a model is pre-trained with large datasets compiled across a diverse spectrum of histology stains, scanners, biological objects and regions across resolution scales. One example of pre-training dataset is now described.

A dataset used for self-supervised pre-training comprises public and proprietary datasets, totaling 55,000,000 unique image tiles at up to four resolutions, resulting in 195M total image tiles sampled from 158,852 WSIs derived from over 50 source sites. As shown in the histograms of FIG. 1, the WSIs span over 16 tissue groups, 28 disease areas, which capture a broad range of benign, malignant, and inflammatory lesions. Additionally, the pre-training set covers four stain groups: hematoxylin and eosin (H&E), formalin-fixed paraffin-embedded (FFPE), H&E frozen, IHC (capturing over 100 distinct IHC stains including PD-L1, HER2, and Ki-67) and special stains (including 7 stains such as trichrome and iron) (Table 12). The base objective magnification of the pre-training set consists of both 20× and 40× slides.

Prior to tile sampling, a ResNet-style convolutional neural network trained to segment artifact, background, and usable tissue may be used to identify usable tissue regions. This network provides significant performance gains for usable tissue identification.

Tiles are sampled from regions of usable tissue at multiple different resolutions. In example, four resolutions are used 40× (0.25 mpp), 20× (0.5 mpp), 10× (1.0 mpp), and 5× (2.0 mpp). Following findings from DINOv2 highlighting the significant value of incorporating curated data into self-supervised pre-training, this dataset is supplemented with an additional set of samples extracted from over 4 million manual annotations from board-certified pathologists. These hand-drawn pathologist annotations correspond to hundreds of different types of biological entities at various scales (e.g., lymphocyte, blood vessel, Gleason pattern 3 prostate cancer, and tumor bed) and ensure coverage of a wide range of biological patterns in the training data. It should be noted, however, the annotations provided by the pathologists were not used during pre-training. In that respect, the model can be viewed as being self-supervised. This source of biological diversity, combined with the broad range of stains, organs, diseases, and source sites, makes this the most diverse large-scale digital pathology dataset to date.

In some embodiments, the pathology images (e.g., WSIs) used in pre-training the backbone of the foundation model are unlabeled, and the pre-training is performed in an unsupervised fashion.

B. Multi-Scale Tasks

Figure 2:
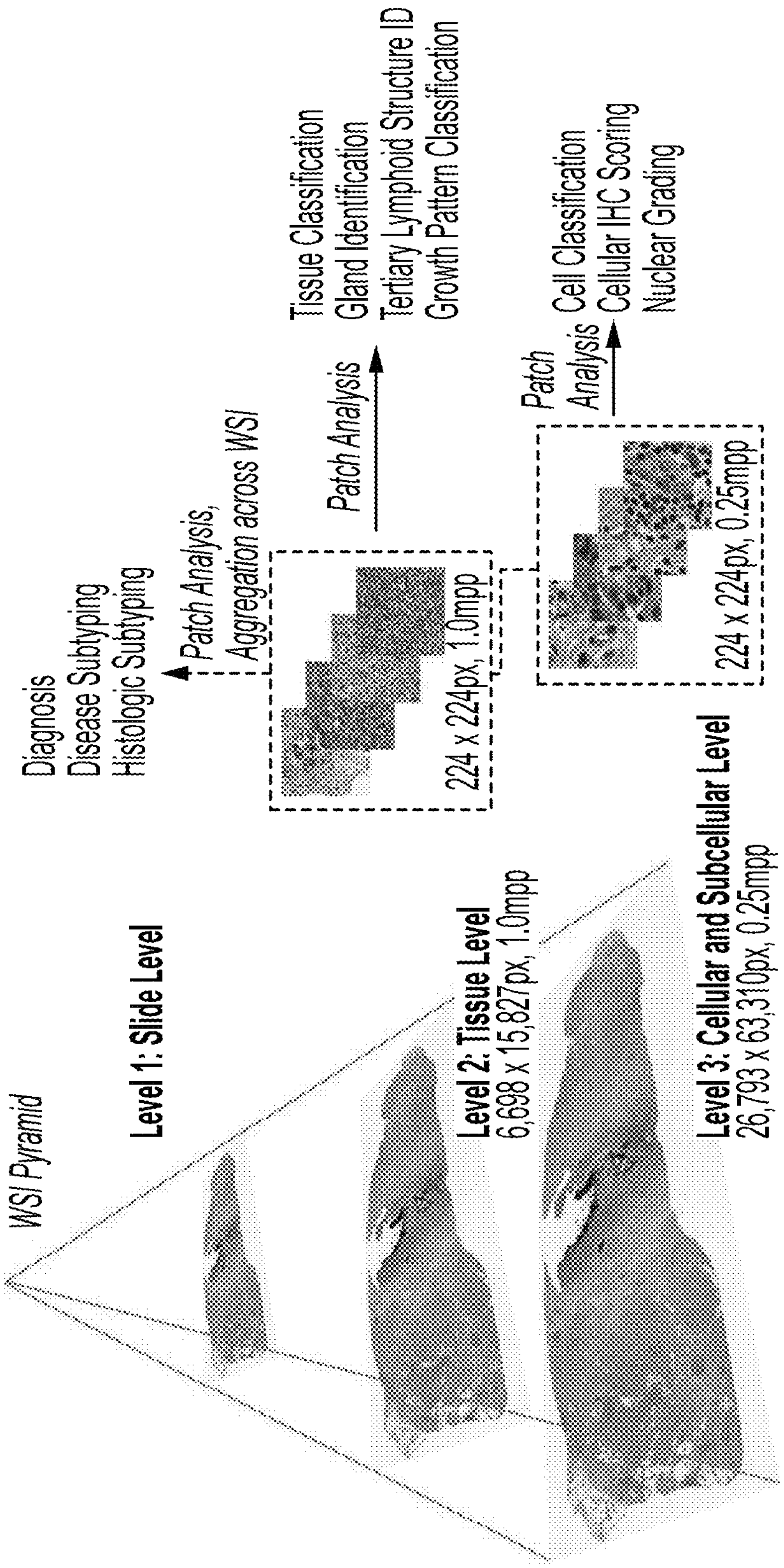
FIG. 2 illustrates a Whole Slide Image (WSI) organized into a pyramid of images at different magnification levels, in accordance with some embodiments.

As shown in FIG. 2, WSIs can be digitized and stored in a multi-scale pyramidal structures, where the base of the pyramid represents the highest-resolution image data as captured by a slide scanner and the top of the pyramid represents the lowest-resolution image data as captured by the slide scanner. The maximal resolution is determined by the magnification of the optical objective as well as the spatial resolution of the scanning sensor used during the digitization process. In sone example, the resulting scan of a WSI can reach 200,000×200,000 pixels at a full resolution 0.25 microns (μm) per pixel (mpp). The different levels of the pyramid may be accessed for different purposes. In some embodiments, one of the resolutions is between 0.25 mpp and 1 mpp and another one of the resolutions in between 1 mpp and 2 mpp.

The inventors have recognized and appreciated that biological entities observed on WSIs vary dramatically in scale, and therefore pathologists will commonly move between magnifications to assess different aspects of a tissue sample on a pathology slide. At low magnification, pathologists may scan across slides to identify regions of interest in the tissue (e.g., with characteristic lengths in the range of 1 mm-1 cm). At middle magnification (such as 5-10×), pathologists commonly view structures at lengths in the range of 200 μm-1 mm. At this scale, pathologists can distinguish between tissue types, glands, tumor growth patterns, histologic subtypes of diseases, or other multicellular entities in the image. At high magnification (such as 20-40×), pathologists can resolve entities at lengths in the range of 1 μm-50 μm, such as individual cell identities, subcellular structural morphology used in determining malignancy, or localization of immuno-histochemical (IHC) staining.

The hierarchical nature of biological entities necessitates considering the multiple scales at which information must be extracted and used by ML algorithms. For example, passing a 224×224 px image tile at 0.25 mpp through an encoder developed for encoding at 1.0 mpp may completely miss relevant nuclear pleomorphism, whereas passing a 224×224 px tile at 1.0 mpp through an encoder developed for encoding at 0.25 mpp may be unable to adequately distinguish between acinar and lepidic growth patterns. The multi-scale WSI format (shown in FIG. 2) captures different resolutions at each level of the pyramid, each lower than the base level.

In some embodiments, pathology tasks can be organized according to biological scales as follows:

- Level 1: Slide Level: This scale includes tasks that label the entire slide such as predicting driver gene mutations in cancer, or Geboes scoring of ulcerative colitis. However, it is uncommon that slide-level assessments are made at slide-level magnification. Typically, assessments made at this scale are aggregated across evaluation of higher-magnification tiles.
- Level 2: Tissue Level: This is the scale at which it is possible to identify and characterize tissue regions (e.g. cancer regions and necrotic regions) and many-cellular objects such as glands.
- Level 3: Cellular and Subcellular Level: This is typically the maximal resolution of a WSI, where cellular and subcellular morphology is evident.

Figure 3:
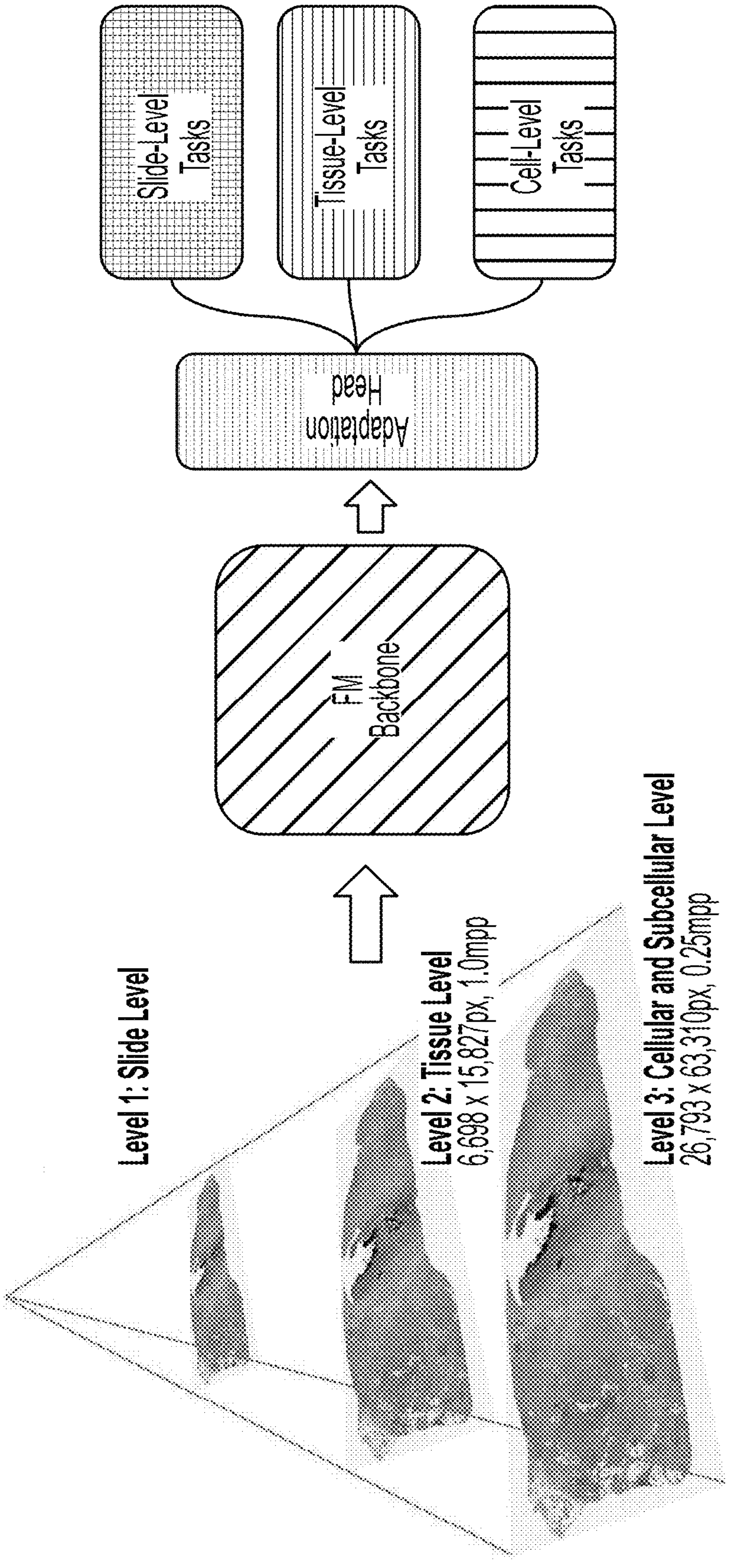
FIG. 3 illustrates an architecture including a foundation model backbone and adaptation heads, in accordance with some embodiments.

FIG. 3 illustrates an architecture including a foundation model backbone that is pre-trained with a multi-scale dataset. Multiple adaptation heads can be plugged to the backbone, enabling performance of various specific tasks without having to re-train the backbone. As described above, in this example, the tasks include slide-level tasks, tissue-level tasks and cell-level tasks.

C. Backbone Architecture

Figure 4:
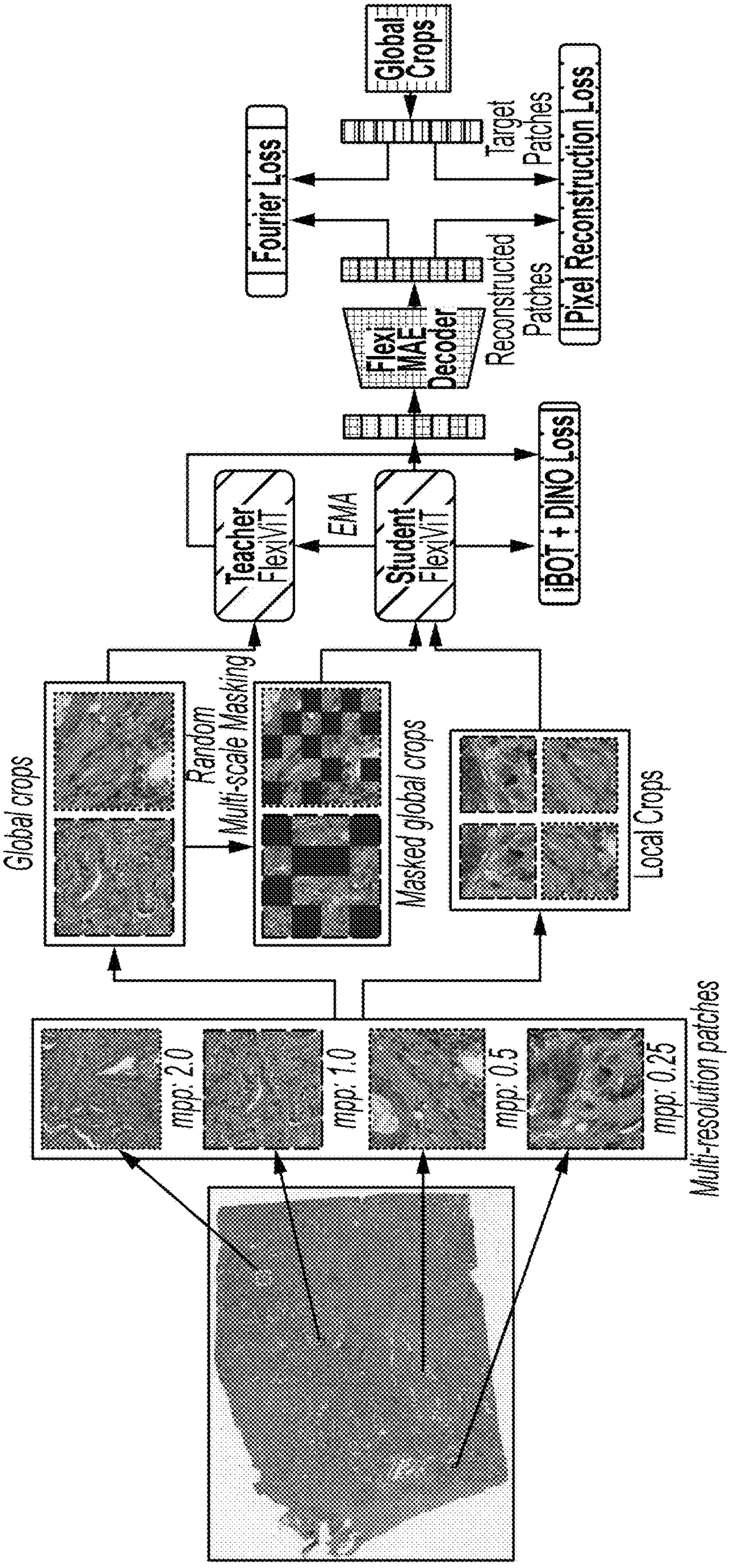
FIG. 4 illustrates an example of a backbone architecture, in accordance with some embodiments.

The inventors have designed a backbone architecture that generates informative feature representations at different length scales. In some embodiments, a ViT backbone is used as the starting point, which is extended to accommodate multiple magnifications during training. A FlexiViT scheme may be used in some embodiments. Backbones of the types described herein are designed to enable use on a wide range of use-cases. An example of a backbone architecture is depicted in FIG. 4.

Some embodiments use DINOv2, which combines DINO and iBOT losses (along with KoLeo regularizer) to learn relevant representations at the image tile and patch levels respectively. It should be noted that the term "image" generally refers to an image tile and term "patch" generally refers to a patch-token obtained by dividing an image into smaller patches (e.g., for processing in ViT). The DINOv2 architecture can be developed for natural images that are often object-centric. Pathology WSI tiles on the other hand have thousands of objects such as nuclei, cells, and glands with different sizes, observed at different image resolutions. To design an encoder which can capture details of objects at different levels of granularity, a Masked Autoencoder (MAE) objective is used with multi-scale masking. The MAE setup attempts to reconstruct masked regions of the input image (often a large fraction of the input) from the unmasked regions. Masking is performed by varying the patch sizes used for masking while using images across different resolutions of the WSI. In addition to the pixel-level reconstruction loss used in MAE, a Fourier reconstruction loss is used to control the amount of low- and high-frequency information preserved during the pre-training process.

To enable the encoder and decoder to handle varying patch sizes for multi-scale masking, a the FlexiViT setup is used. Since the patch size controls the granularity of information captured by the encoder, different downstream tasks may need different patch sizes for optimal performance. Pre-training the backbone with multi-resolution patches allows to adapt the same backbone to different tasks without needing to train a backbone for every patch size. The patch size also determines the effective sequence length used in ViTs, and the FlexiViT setup allows to cater to different compute budgets by selecting the most suitable patch size at inference time.

II. Backbone Pre-Training

Images are extracted from datasets of the types described in Section I(A)-I(B). The image resolution may be selected randomly (e.g., with prespecified probabilities). Global crops (e.g., two) and local crops (e.g., four) of suitable sizes (e.g., 224 and 96 respectively) may be taken from each image, consistent with DINOv2 training. The local crops may be passed to the student, while the global crops may be passed to the teacher. The teacher's weights may be updated using an exponential moving average of the student's weights rather than backpropagation. The crops provided to the student may be randomly masked for the iBoT objective. Further, a separate masking setup with a higher masking ratio may be applied to the global crops for the MAE objective. The mask sizes are consistent with the dynamic patch sizes, and the flexible patch embedding step ensures that the architecture can accommodate patches of variable size during training. Since a vanilla MAE decoder cannot work with variable sized masks due to the presence of linear layers, a similar "flexification" setup is added to the MAE decoder to generate reconstructions with variable mask sizes. Learnable position embeddings are used in the MAE decoder. A L2-norm loss may be used for the MAE objective between the reconstructed and the original image.

Beyond the original MAE objective, the reconstructed image may be decomposed into its low- and high-frequency components. This decomposition is important for addressing distinct aspects of image quality that are captured in different frequency ranges. To achieve this, the Fourier spectrum of the reconstructed image may be dissected into low-frequency and high-frequency bands using a set of low-pass and high-pass filters. By applying these filters, the method effectively isolates the components of the image that represent basic structures and details (low frequency) from those encapsulating finer details and textures (high frequency). After this separation, the L2 loss may be computed independently for both the low- and high-frequency parts of the image. This bifurcated approach allows for a more nuanced adjustment and optimization of the reconstructed image by applying tunable weights to the losses from each frequency band before their aggregation. The sum of these weighted losses forms the overall Fourier reconstruction loss, which the training process aims to minimize. The whole loss function $L(y\hat{}, y)$ is listed in Eq. (1) and the detailed Fourier loss $L_{Fourier}(y\hat{}, y)$ is listed in Eq. (2), where y^ represents the masked regions of the predicted image and y represents the masked regions of the ground truth image. The Discrete Fourier Transform (DFT) is denoted by F. The mask M in the Fourier space acts as a low-pass filter, and 1-M acts as a high-pass filter. The weights λ1 and λ2 are used to balance the contributions of the low-pass and high-pass filtered errors, respectively. In one example, the value of λ1 is set to 5 and λ2 is set to 1. The weights of other losses may be set to 1. ||•||2 denotes the L2 loss.

$$L(y^\wedge, y) = L_{DINO}(y^\wedge, y) + L_{iBOT}(y^\wedge, y) + L_{MAE}(y^\wedge, y) + L_{Fourier}(y^\wedge, y) \quad (1)$$

$$L_{Fourier}(y^\wedge, y) = \quad (2)$$

$$\lambda_1 \cdot \|M \cdot F(y^\wedge) - M \cdot F(y)\|^2 + \lambda_2 \cdot \|(1-M) \cdot F(y^\wedge) - (1-M) \cdot F(y)\|^2$$

One version of the model (referred to as Vanilla model) is also trained without the MAE and Fourier losses. The vanilla model still contains support for flexible patch sizes. Slightly better performance is observed with the teacher over the student. As such, use of the teacher for all downstream tasks is preferrable (although not required).

Ine one example, a ViT-S is used for the student and teacher encoders, and a shallower model is used for the MAE decoder. For training, an AdamW can be used with a base learning rate of 0.002 and a learning rate warmup for the first 5 epochs. A distributed training setup may be used to scale the training across 64 GPUs.

III. Adaptation Heads

The backbone training process outlined above learns generic, task-features. In order to leverage its general capabilities, task-specific heads may be added and adapted through supervised fine-tuning, while keeping the backbone fixed (frozen). This adaptation process is efficient and provides the flexibility to use the same pre-trained backbone for specialized tasks across the biological scales described in Section I(B). While different tasks may require the use of different patch sizes to capture relevant context, the multi-resolution backbone described herein allows to dynamically select the backbone patch size for adaptation.

Figure 5:
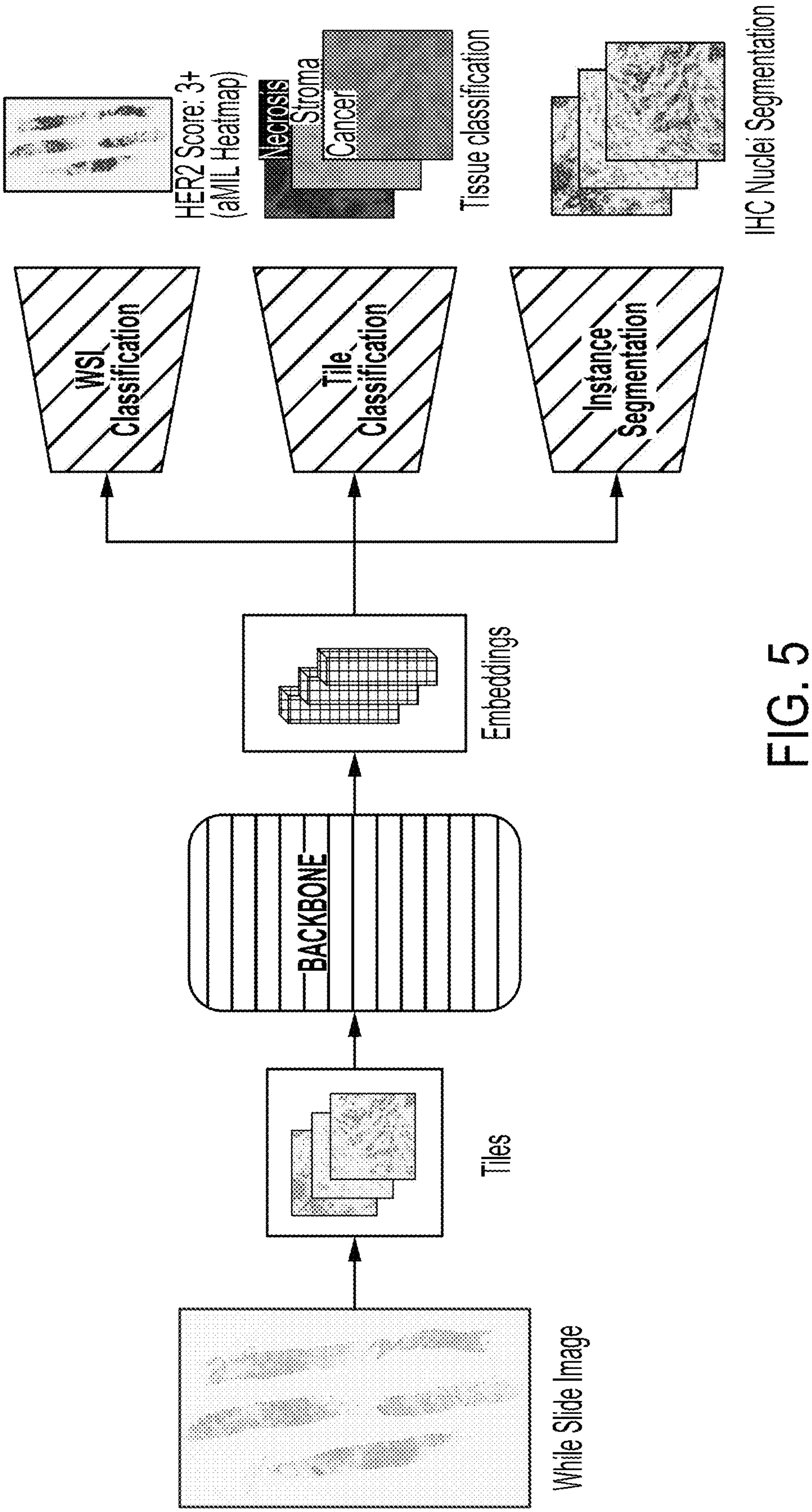
FIG. 5 illustrates an example of a model including a backbone and multiple adaptation heads, in accordance with some embodiments.

In the following sub-sections, techniques underlying the specialized task are described. Section III(A) describes adaptation to slide-level classification tasks. This may be performed using a multiple-instance learning (MIL) head, further discussed in Section VI. Section III(B) describes adaptation to tissue-level. Section III(C) describes adaptation to cellular-level and subcellular-level biological scales, which may be implemented using tile-level classification and instance segmentation task heads. The overall architecture is illustrated in FIG. 5.

A. Slide-Level Adaptation

Slide-level task adaptation may involve performing weak supervision on slide-level labels. In particular, some embodiments may use a MIL model (described in detail in Section VI), a weakly supervised learning technique where sets of instances are grouped into a "bag" and used to learn bag-level labels. As discussed below, MIL models may involve three parts: (1) a featurizer which generates representations of each image tile in a bag, (2) an aggregation module which combines tile representations using a permutation-invariant function (typically attention) to generate a bag-level representation, and (3) a classifier which outputs a bag-level prediction. A backbone may be adapted using the pre-trained backbones directly as featurizers, with the adaptation heads (which are the downstream components including an attention module and classifier layer) operating on the feature vectors generated from these backbones. These models are trained with the featurizer either frozen (FZ) or unfrozen (FT, or fine-tuned) during MIL training. An Additive MIL classifier may be used, which enables interpretable model predictions and class-wise heatmaps. Additive MIL classifiers are discussed in Section VI(B).

B. Tissue-Level, Cellular- and Subcellular-Level Task Adaptation

Adaptation to tissue-level and cellular/subcellular-level biological scales may be obtained through fine-tuning either a tile classification or an instance segmentation adaptation head. These two adaptation strategies are informed by the availability of labeled data. Tile-level classification may only require labels at the image tile level, whereas instance segmentation may require pixel-level annotations.

A range of adaptation head architectures is considered for tile classification, ranging from single linear layers to multilayer perceptrons (MLPs) with different pooling strategies. By incorporating domain-specific knowledge from histopathology tiles, the aim is to develop a light-weight adaptation head that identifies critical features captured in the backbone embeddings of these tiles, such as cellular morphology and tissue region characteristics. This allows for the classification of tiles into various categories, such as healthy tissue or cancerous tissue regions.

In the analysis of gigapixel histopathology slides, such tile-level classification tasks can be effective substitutes for segmentation, a task which presents significant challenges in terms of collecting exhaustive, high-quality annotations. However, morphological descriptors of nuclei, cells, glands, vessels, and other biological entities are crucial prognostic indicators for various pathological analyses. Therefore, specialized task heads are designed for instance segmentation, enhancing the model's ability to effectively analyze and interpret these critical features.

Figure 6:
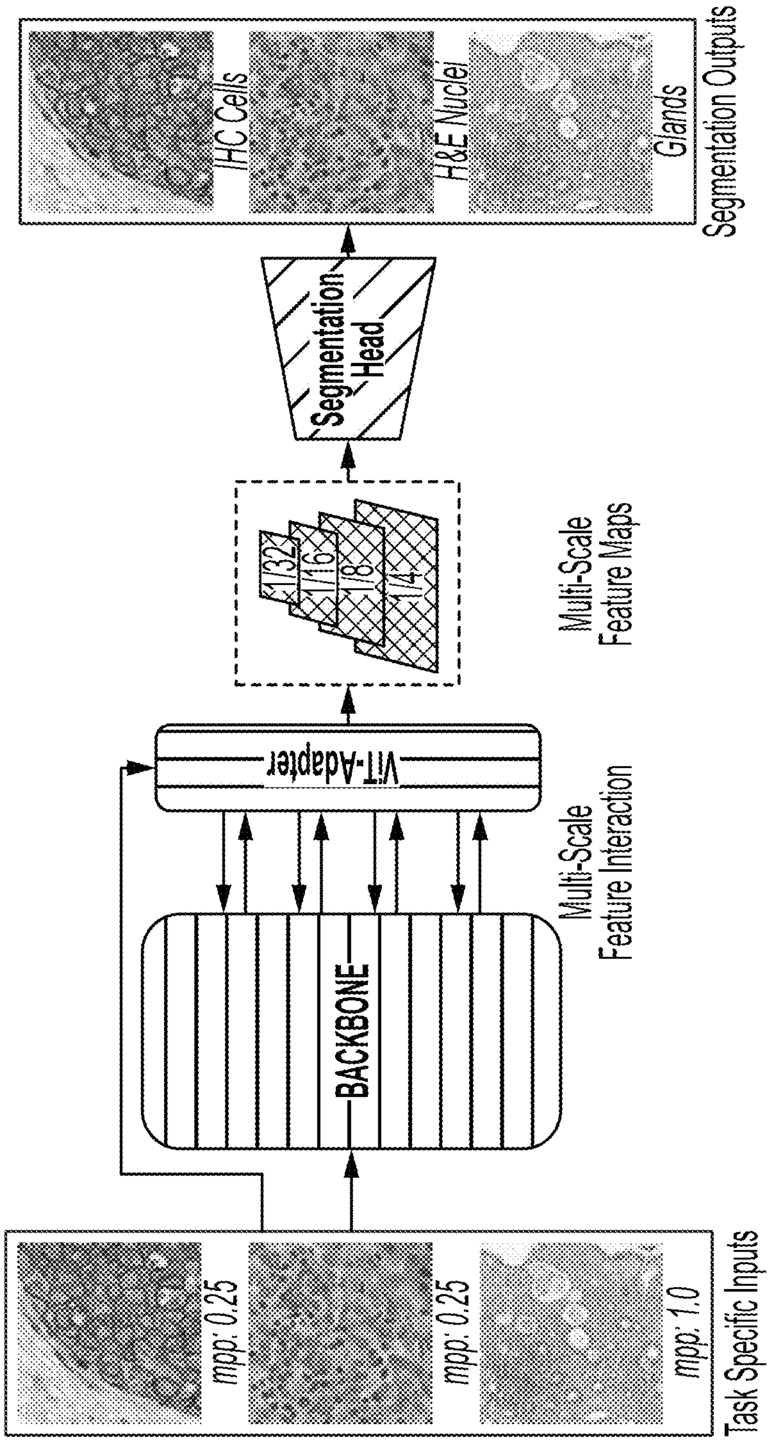
FIG. 6 illustrates another example of a model including a backbone and multiple adaptation heads, in accordance with some embodiments.

In one example, a pre-trained backbone is adapted to instance segmentation tasks via two distinct frameworks: Mask R-CNN and Mask2Former. An example is illustrated in FIG. 6. While Mask R-CNN relies on region proposals and conventional mechanisms such as non-maximum suppression, Mask2Former employs a transformer-based approach, leveraging object queries to generate instance segmentation results, a methodology that presents a compelling advantage for our purposes since it does not rely on hand-tuned region proposals. In some embodiments, the ViT is combined with a ViT-Adapter, which improve segmentation performance. The output feature maps of the adapter, corresponding to a spatial resolutions of the input image, are used as the input to Mask R-CNN and Mask2Former. In some embodiments, a feature pyramid network (FPN) is inserted between the backbone (with or without adapter) and the task head, consistent with the ViT-adapter experimentation setup.

IV. Results

Results are provided below to illustrate the capabilities of the models described above.

A. Slide-Level Results

We consider two slide-level prediction tasks for evaluating our backbone. The first is the prediction of the cancer subtypes Adenocarcinoma and Squamous cell carcinoma in non-small cell lung carcinoma (NSCLC) H&E-stained WSIs, a popular benchmark for slide-level evaluation. The second is the quantification of the HER2 biomarker across four scores (0, 1+, 2+, 3+) in IHC-stained breast cancer slides, which measures the expression level of the HER2 protein and is clinically relevant for targeted patient therapy.

For NSCLC subtyping, we use slides from the publicly available TCGA Adenocarcinoma (LUAD) and Squamous Cell Carcinoma (LUSC) groups. We use 500 slides for model development and 247 (128 LUAD/119 LUSC) slides for test set evaluation. We evaluate out-of-distribution (OOD) performance using a proprietary dataset of 205 WSIs (162 Adenocarcinoma WSIs, 45 Squamous Cell Carcinoma WSIs) collected from a different source site with varying image acquisition and processing steps, resulting in visual differences from the TCGA WSIs. Since slide-level prediction tasks are often limited by the number of slides available for development, we limit our development set to 500 slides for both of these tasks and evaluated model performance on in-distribution (ID) and out-of-distribution (OOD) test sets.

For HER2 scoring, we use slides from an internal dataset constructed from multiple source sites, scanners and stain clones. We use 500 slides for model development and 250 slides with similar sample characteristics for ID evaluation. For OOD evaluation we use 229 slides collected from two held-out source sites with different sample characteristics.

Figure 7:
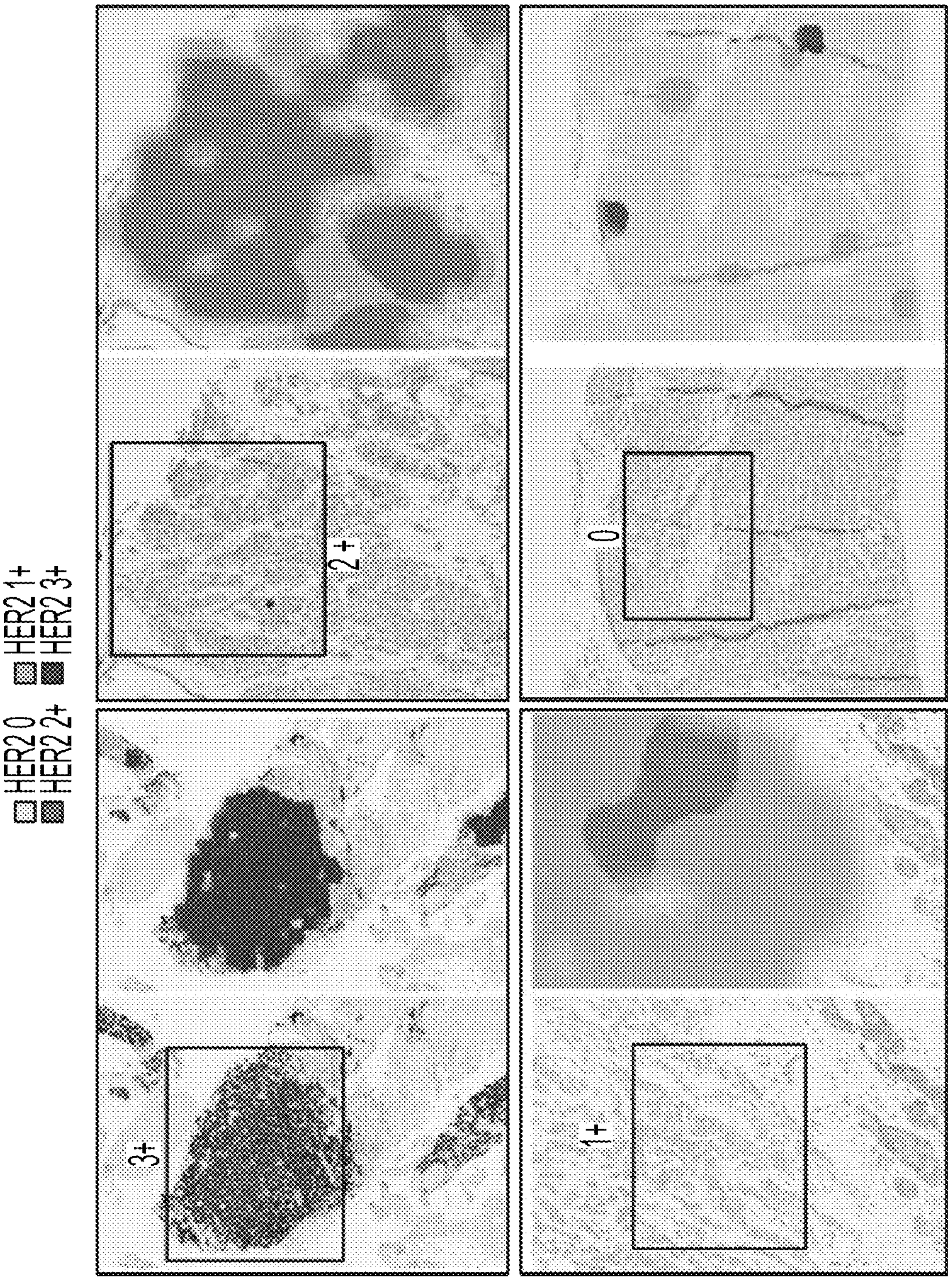
FIG. 7 illustrates examples comparing heatmaps computed using Additive MIL with ground truth ROIs, in accordance with some embodiments.

In the case of NSCLC, the out-of-distribution (OOD) slides exhibit distinct characteristics compared to the in-distribution TCGA slides. As a result, all models experience a decrease in performance. However, the models described here mitigate this decrease in performance. We use an Additive MIL to generate heatmaps to identify regions on the slide corresponding to different HER2 scores. Examples comparing the heatmaps with ground truth ROIs are illustrated in FIG. 7.

B. Tissue-Level Results

Publicly available datasets consisting of 107,180 images (224×224 at 0.5 mpp) of human colorectal cancer (CRC) and normal tissue extracted from 136 H&E histopathology WSIs were used, and classified into one of nine tissue classes. The training set consists of 100,000 images (referred as NCT-CRC-HE-100K) and the evaluation set consists of 7, 180 images (referred as CRC-VAL-HE-7K). Performance was measured using accuracy (Acc.) and balanced accuracy (Bal. Acc.). The resulting accuracy was 96.0 and balanced accuracy 94.6.

The Camelyon17-WILDS dataset contains 455, 954 images (96×96 pixels at 1 mpp, downsampled from 0.25 mpp slides) from 50 WSIs of breast cancer metastases in lymph node sections from five different hospitals. The task is a binary classification of whether the central 32×32 region contains tumor tissue. The training set consists of 302,436 tiles from 30 WSIs from three hospitals, the ID validation set of 33, 560 from the same 30 WSIs, the OOD validation set of 34, 904 from 10 WSIs from the fourth hospital, and the OOD test set of 85,054 from 10 WSIs from the fifth hospital. Each split has a 50/50 class balance. Performance was evaluated using accuracy in the OOD test set, measuring robustness to shifts across hospitals.

The model obtained competitive performance in the CRC-100K dataset with the best performing models (96.2 accuracy), despite having significantly fewer parameters and a smaller—but highly diverse—pre-training dataset. Our high performance in Camelyon17-WILDS further demonstrates the utility of our pre-training setup.

We probe the CLS-token and patch-token embeddings on tile-level tissue classification in a broad set of indications and stains. All labels are derived from board-certified pathologists, and substances are chosen to capture the most relevant biology in those indications. In particular, we consider the following to test the adaptability of the model across diverse diseases, stains, and organs:

- Four-class H&E Pan-Oncology Tissue: cancer, necrosis, cancer-associated stroma, normal tissue
- Four-class IHC Pan-Oncology Tissue: cancer, necrosis, cancer-associated stroma, normal tissue
- 10-class H&E Inflammatory Bowel Disease (IBD) Tissue: crypt abscess, inter gland lumen, infiltrated epithelium, normal tissue, other tissue, blood vessel, granulation tissue, erosion or ulceration, lamina propria, muscularis mucosa.

We begin by treating the tissue task as a simple tile classification problem and use an MLP on top of the CLS tokens for probing. Along with simple probing, we use a variant of attentive probing, where the CLS embedding is augmented by concatenating an attention-pooled summary of the patch-tokens. The attention pooling allows the classifier to learn relevant context from across the entire image, and results in a performance improvement over only using the CLS embedding. We find that the CLS embeddings from the model are particularly suited for each task out of the box, demonstrating the value of our pathology-relevant auxiliary losses.

Comparing Oncology and IBD Tissue results demonstrates that the best adaptation approach is dependent on the target task. On a four-class tissue problem, the CLS token holds the vast majority of the necessary signal, and adding the learned attention pooling results in less significant benefits. However, in 10-class IBD Tissue, the classifier struggles when relying only on the CLS token and must instead learn to attend to selective patches.

Figure 8:
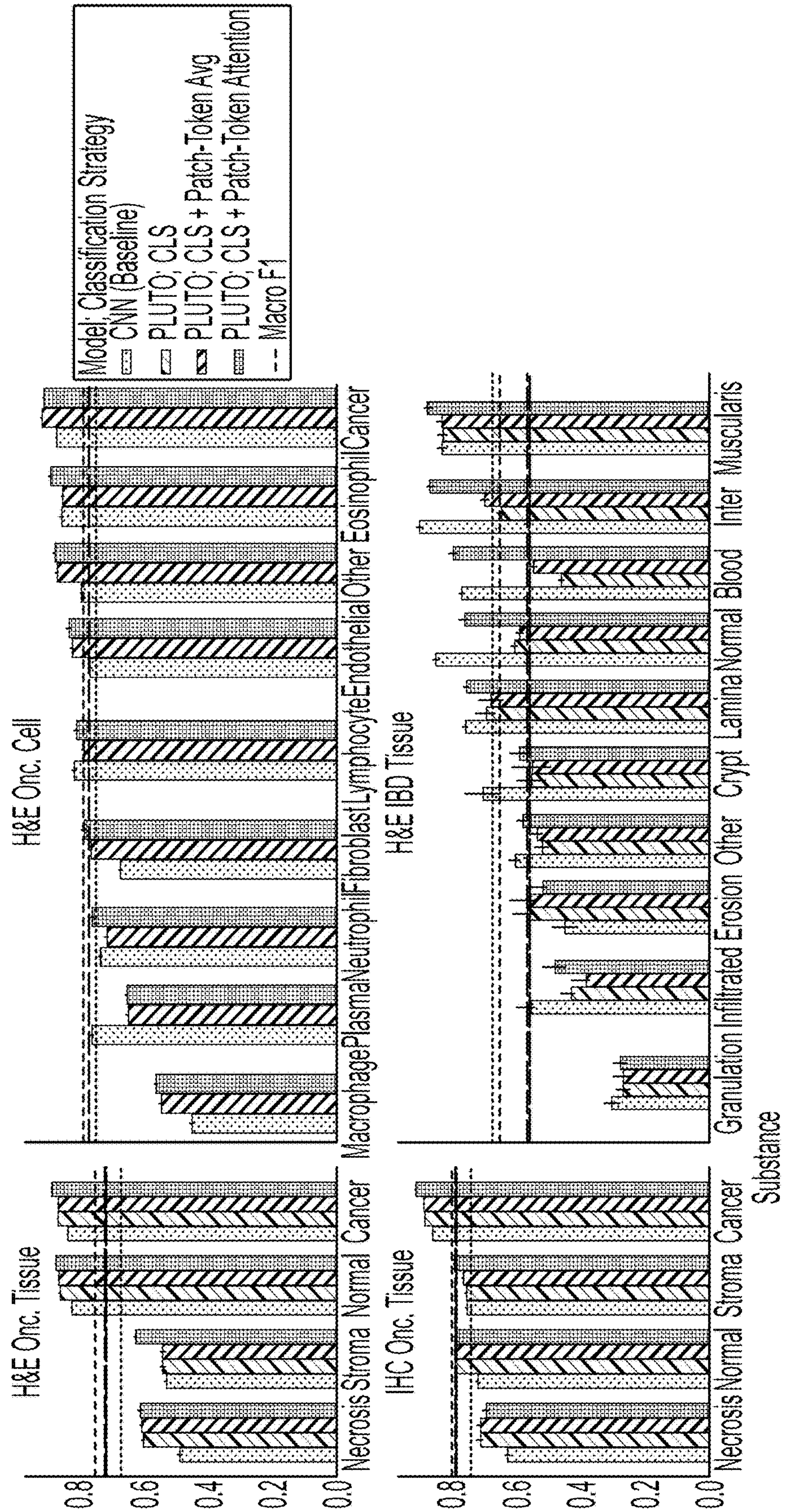
FIG. 8 illustrates class-level and aggregated performance across multiple datasets, in accordance with some embodiments.

To contextualize the results, we train a ResNet-style fully supervised CNN model from scratch on the same dataset. We demonstrate that by using our model (PLUTO) in combination with a small amount of labeled data and an optimal adaptation approach, we outperform the baseline fully-supervised model on Oncology indications and achieve statistically equivalent performance on IBD Tissue Classification. We reason that the level of detail necessary to distinguish morphology among IBD classes warrants further exploration into optimal light-weight methods for extracting information from frozen embeddings. FIG. 8 captures the class-level and aggregated performance for all datasets.

In another example, gland morphology is used in gastrointestinal (GI) tract pathology. The architectural appearance of glands is vital for cancer grading in colorectal carcinoma. In ulcerative colitis or IBD, changes in crypt architecture (density, morphology, etc.) are a core component of the Geboes scoring system. Outside of the GI tract, gland differentiation is important for diagnosis and grading in breast and other cancers. We evaluated the performance on the GlaS dataset, which consists of 85 images for training and 80 images for testing for a total of 165 images derived from 16 H&E-stained sections of stage T3 or T42 colorectal adenocarcinoma. These slides were scanned using a Zeiss MIRAX MIDI Slide Scanner with a resolution of 0.465 mpp and varying image sizes (most commonly 775×522). Performance was measured using dice coefficient (Dice) and Intersection over Union (IoU) in the test set. To the best of our knowledge, this is the first pathology FM used in a gland segmentation task. The model achieved a Dice of 91.2. This underscores the ability of the proposed approach to successfully adapt to a new tissue-level segmentation task with limited labeled data.

Figure 9A:
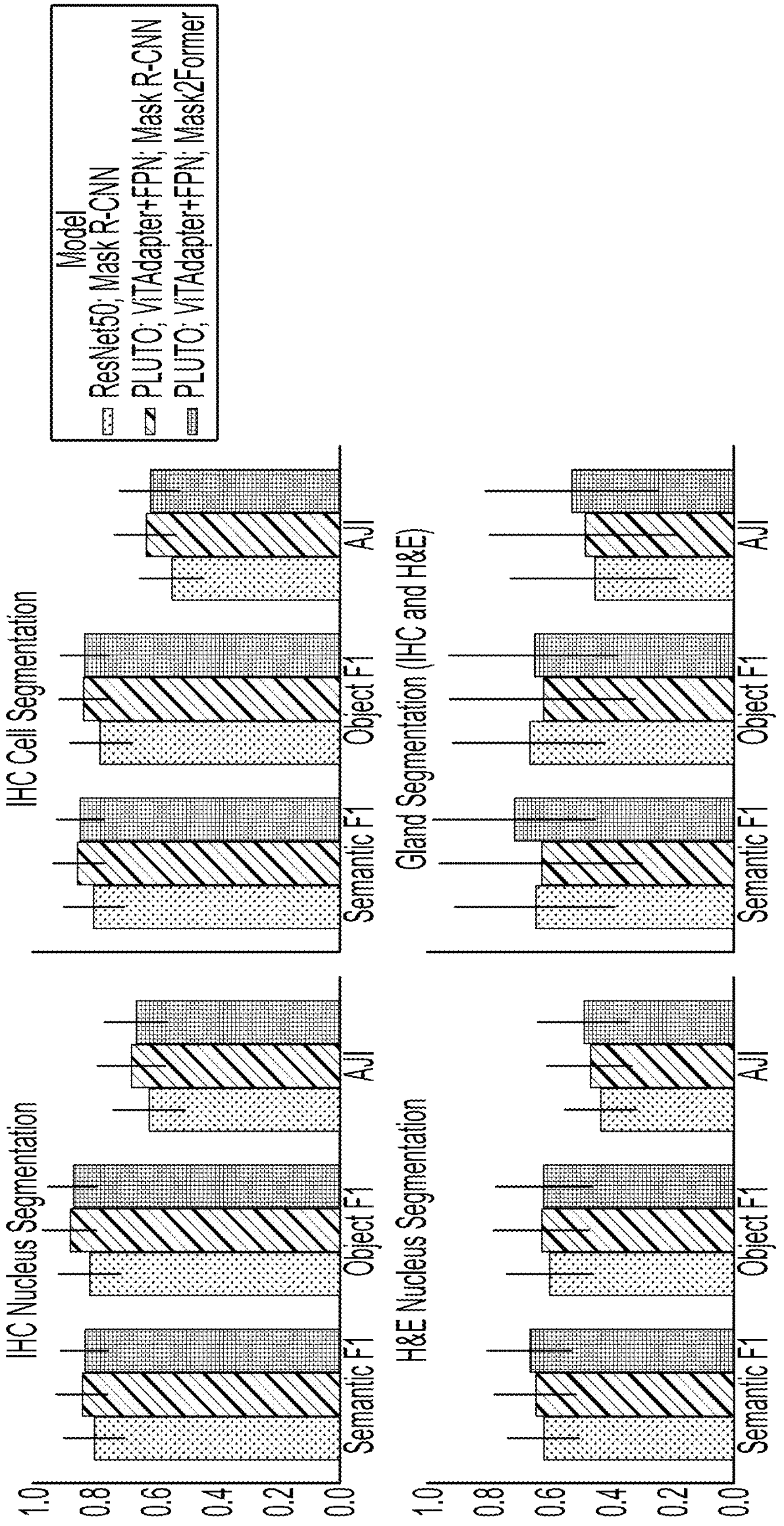
FIG. 9A-9B illustrate results obtained from segmentation of glands across stains, organs, and disease areas, in accordance with some embodiments.
Figure 9B:
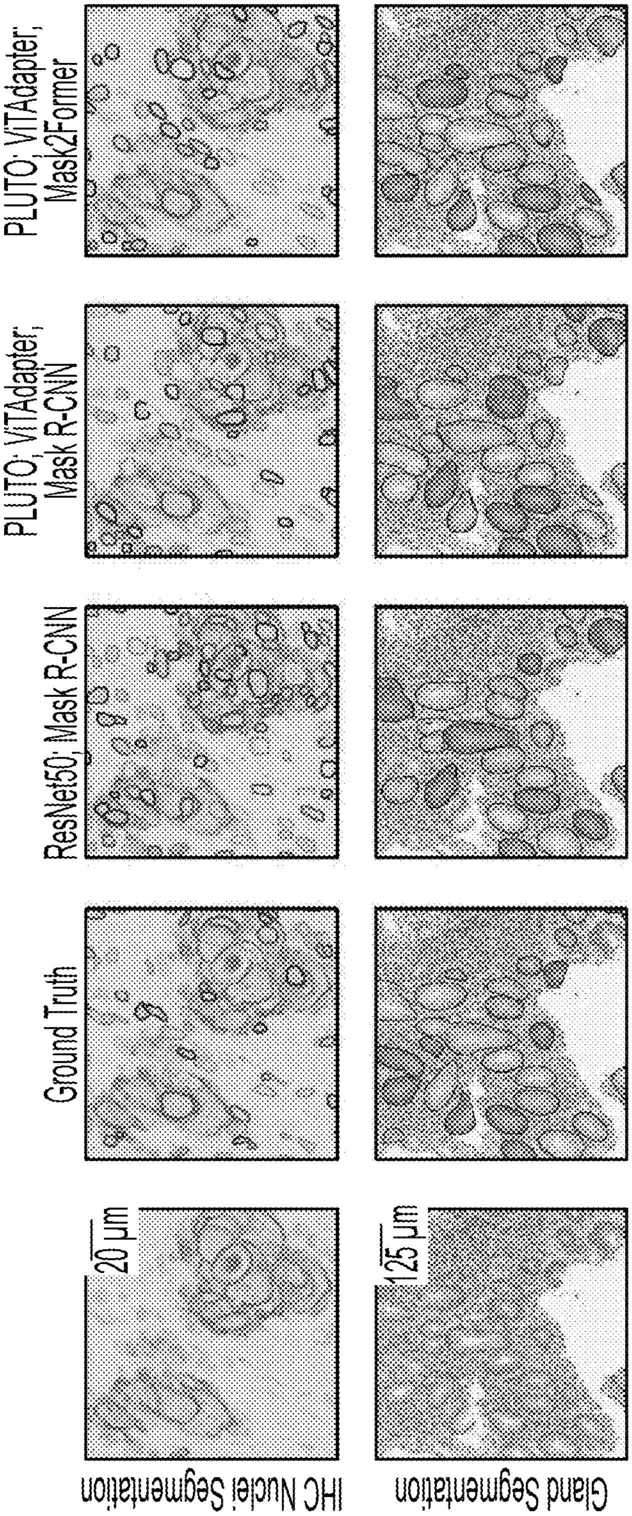

We also curate an internal instance segmentation dataset to segment glands across stains, organs, and disease areas. Results are shown in FIG. 9A with qualitative comparisons in FIG. 9B.

We train on samples of size 768×768 at a resolution of 1 mpp using our proposed adaptation approaches. Both of our adaptation approaches beat the Mask R-CNN baseline using a frozen ResNet50 backbone, with the Mask2Former adaptation head providing the highest performance across all metrics. We notice that Mask2Former works better on glands where the objects are not close to convex-like shapes and we hypothesize that the query based segmentation mechanism is helping the network and we aim to explore this in future work.

C. Cellular-Level and Subcellular-Level Results

Tile classification is extended to the nine-class H&E Oncology cell benchmark. The label for each tile is derived from the cell class present at the center pixel of the tile. Because the CLS token does not capture the granular information needed for cell classification, we concatenate it with an average pooling of the four central patch token embeddings. We then extend the approach to Attention Pooling by allowing the learned attention layer to see all patch tokens in the tile. The result is shown alongside the tissue classification tasks in FIG. 8. The context in the center four patch tokens provides sufficient signal for cell classification, but learned attention pooling on the entire tile achieves slightly better results on almost all substances.

Instance segmentation is a popular approach for nucleus, cytoplasm, and cell quantification on H&E and IHC-stained WSIs. We evaluated the performance of our adaptation strategies on the PanNuke dataset. It consists of 481 visual fields across 19 different tissue types from WSIs from TCGA and a local hospital, with a total of 189, 744 exhaustive nuclei labels categorized into five classes. The visual fields were randomly sampled from more than 20,000 WSIs that were scanned at either 40× or 20× and re-sized to 40×.

For the ablation study comparing different adaptation heads, experiments were conducted in the binary configuration where nuclei were not classified, and therefore only bPQ is reported. The experimental setup used an inference patch size of 16 for the HoverNet architecture due to its design. All conducted experiments were thus performed using this specified patch size Despite its significantly smaller architecture, our model (without fine-tuning) achieved nuclei segmentation performance comparable to state-of-the-art with much larger models.

IHC is a widely used tool in pathology for disease diagnosis and subtyping, cell classification, and quantification of protein abundance. IHC staining utilizes antibodies targeted against certain antigens in specific tissues and cells to directly quantify protein abundance, and often its localization within the cell (e.g. membranous, cytoplasmic, or nuclear staining). Thus, specially in IHC, it is important to not only identify individual cells and nuclei but also precisely delineate their boundaries. We curate internal datasets for IHC Cell Segmentation, IHC and H&E Nuclei Segmentation. We compare Mask R-CNN with ResNet50 and ViT backbones, and compare Mask R-CNN with a Mask2Former adaptation head. The results from these experiments on IHC Nuclei and Cell Segmentation and H&E Nuclei Segmentation are summarized in FIG. 9A with qualitative comparisons in FIG. 9B. We train on samples of size 384×384 at resolution of 0.25 mpp. We find that our adaptation approaches beat the Mask R-CNN baseline using a frozen ResnNet50 backbone.

V. Deployability

Given the increasing adoption of machine learning (ML) in digital pathology for clinical and diagnostic use-cases, there is a need for ML algorithms which are robust and can be deployed at scale to address patient and clinician needs. Real-world deployment of ML algorithms needs careful consideration of factors like deployment throughput, algorithm latency for end-users and cost of deployment. While FMs can enable new capabilities and improve generalization, they are often orders of magnitude larger than task-specific models, and deploying them on WSIs can be significantly expensive and time-consuming.

Figure 9C:
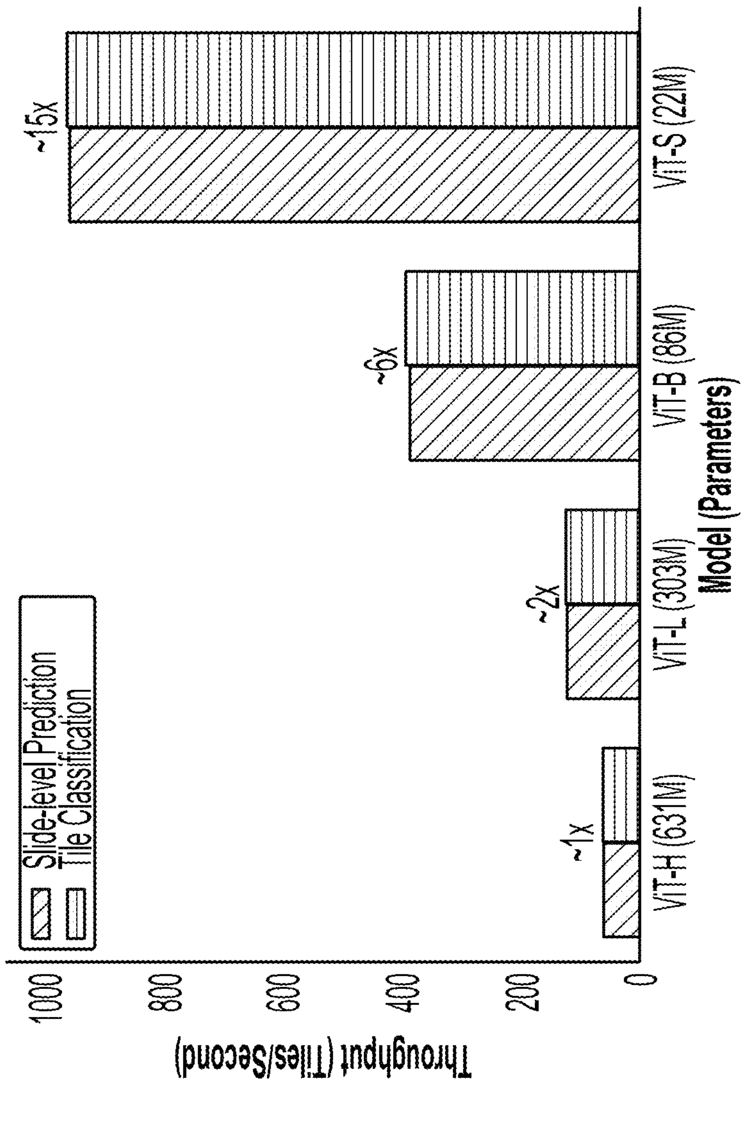
FIG. 9C illustrates throughput (tiles/sec) of models for tile-level and slide-level classification tasks, in accordance with some embodiments.

In some embodiments, a ViT architecture ViT-S is selected as the backbone, as it is light-weight while still having enough model capacity to be performant at different tasks. Additionally, the FlexiViT architecture enables customization of the patch size, which not only enables selecting the optimal patch size for a downstream task, but can also be used to improve model throughput as the patch size controls the sequence length. To illustrate the efficiency of the model, we compare the throughput efficiency of various ViT backbones (ViT-S, ViTB, ViT-L, ViT-H) for two common pathology tasks-tile classification and slide-level prediction. We fix the task-specific adaptation heads: linear layer for patch-classification, and AdditiveMIL for slide-level prediction while varying the backbone and measure the throughput in tiles/second with a tile size of 224×224 and a patch size of 16. We note that we have not applied any inference-specific optimizations in this setup. We use the same data-loading pipeline and hardware (A40 GPU) for all the backbones. As depicted in FIG. 9C, for both the tasks, ViT-S is around 2.5× faster than ViT-B, 7.5× faster than ViT-L and 15× faster than ViT-H.

VI. Slide-Level Adaptation: Multiple Instance Learning (MIL) Models

Described herein is a formulation of Multiple Instance Learning (MIL) models that enables interpretability while maintaining similar predictive performance. MIL models of the types described herein may be used to perform adaptation of foundation models, for slide-level applications. The models developed by the inventors and described herein enable spatial credit assignment such that the contribution of each region in an image can be accurately computed and visualized. The resulting spatial credit assignment coincides with regions used by pathologists during diagnosis and improves upon classical attention heatmaps from attention MIL models. These models can debug model failures, identify spurious features, and highlight class-wise regions of interest, enabling their use in high-stakes environments such as clinical decision-making.

Histopathology is the study and diagnosis of disease by microscopic inspection of tissue. Histologic examination of tissue samples plays a key role in both clinical diagnosis and drug development. It is regarded as medicine's ground truth for various diseases and is important in evaluating disease severity, measuring treatment effects, and biomarker scoring. A differentiating feature of digitized tissue slides or whole slide images (WSI) is their extremely large size, often billions of pixels per image. In addition to being large, WSIs are extremely information dense, with each image containing thousands of cells and detailed tissue regions that make manual analysis of these images challenging. This information richness makes pathology an excellent application for machine learning, and indeed there has been tremendous progress in recent years in applying machine learning to pathology data.

One of the most important applications of machine learning in digital pathology involves predicting patient's clinical characteristics from a WSI image. Models need to be able to make predictions about the entire slide involving all the patient tissue available; these predictions are referred to as "slide-level". To overcome the challenges presented by the large size of these images, previous methods have used smaller hand engineered representations, built from biological primitives in tissue such as cellular composition and structures. Another common way to overcome the challenges presented by the size of WSIs is to break the slide into thousands of small patches, train a model with these patches to predict the slide-label, and then use a secondary model to learn an aggregation function from patch representations to slide-level label. Both methods are not trained in an end-to-end manner and suffer from suboptimal performance. The second method also suffers from an incorrect assumption that each patch from a slide has the same label as the overall slide.

MIL is a weakly supervised learning technique which attempts to learn a mapping from a set of instances (called a bag) to a single label associated with the whole bag. MIL can be applied to pathology by treating patches from slides as instances which form a bag and a slide-level label is associated with each bag to learn a bag predictor. This circumvents the need to collect patch-level labels and allows end-to-end training from a WSI. The MIL assumption that at least one patch among the set of patches is associated with the target label works well for many biological problems. For example, the MIL assumption holds for the task of cancer diagnosis; a sufficiently large bag of instances or patches from a cancerous slide will contain at least one cancerous patch whereas a benign slide will never contain a cancerous patch. In recent years, attention-based pooling of patches has been shown to be successful for MIL problems. Using neural networks with attention MIL has become the standard for end-to-end pathology models as it provides a powerful, yet efficient gradient based method to learn a slide-to-label mapping. In addition to superior performance, these models encode some level of spatial interpretability within the model through visualization of highly attended regions.

The sensitive nature of the medical imaging domain requires deployed machine learning models to be interpretable for multiple reasons. First, it is critical that models do not learn spurious shortcuts over true signal and can be debugged if such failure modes exist. Interpretability and explainability methods have been shown to help identify some of these data and model deficiencies. Secondly, for algorithms in medical decision-making, accountability and rigorous validation precedes adoption. Interpretable models can be easier to validate and thus build trust. Specifically, users can verify that model predictions are generated using biologically concordant features that are supported by scientific evidence and are similar to the those identified by human experts. Thirdly, use-cases involving a human expert such as decision-support require the algorithm to give a visual cue which highlights the regions to be examined more carefully. In these applications, a predicted score is insufficient and needs to be complemented with a highlighted visual region associated with the model's prediction. For machine learning models in pathology, spatial credit assignment can be defined as attributing model predictions to specific spatial regions in the slide. Various post-hoc interpretability techniques like gradient based methods and Local Interpretable Model-agnostic Explanation (LIME) have been used to this end. However, gradient based methods which try to construct model-dependent saliency maps are often insensitive to the model or the data. This makes these post-hoc methods unreliable for spatial attribution as they provide poor localization and do not reflect the model's predictions.

Model-agnostic methods like Shapley values or LIME involve intractable computations for large image data and thus need approximations like locally fitting explanations to model predictions, which can lead to incorrect attribution. Applying attention MIL in weakly supervised problems in pathology leads to learning of the attention scores for each patch. These scores can be used as a proxy for patch importance, thus helping in spatial credit assignment. This way of interpreting MIL models has been used commonly in the literature to create spatial heatmaps, image overlays that indicate credit assignment, for free without applying any post-hoc technique. The attention values that scale patch feature representations have a non-linear relationship to the final prediction, making their visual interpretation inexact and incomplete.

To address these issues, the inventors propose a formulation of MIL which induces intrinsically interpretable heatmaps. This model is referred to herein as "additive MIL." It allows for precise decomposition of a model prediction in terms of spatial regions of the input. These models, instead of being applied to arbitrary features, are grounded as patch instances in the MIL formulation which allows precise (e.g., exact) credit assignment for each patch in a bag. Specifically, this is achieved by constraining the space of predictor functions (the classification or regression head at the final layer) in the MIL setup to be additive in terms of instances. Therefore, the contribution of each patch or instance in a bag can be traced back from the final predictions. These additive scores reflect the true marginal contribution of each patch to a prediction and can be visualized as a heatmap on a slide for various applications like model debugging, validating model performance, and identifying spurious features.

The inventors have recognized and appreciated that these benefits can be achieved without any material loss of predictive performance even though the predictor function is constrained to be additive. This represents a substantial improvement over previous MIL implementations.

A. MIL Models

An attention MIL model can be seen as a 3-part model involving:

- a featurizer (f), typically a deep convolutional neural network (CNN),
- an attention module (m), which induces a soft attention over N patches and is used to scale each patch feature, and
- a predictor (p), which takes the attended patch representations, aggregates them using a permutation invariant function like sum pooling over the N patches, and then outputs a prediction. This MIL model g(x) is given by:

$$g(x) = (p \circ m \circ f)(x) \tag{1}$$

$$m_i(x) = \alpha_i f(x_i) \text{ where } \alpha_i = softmax_i(\psi_m(x)) \tag{2}$$

$$p(x) = \psi_p\left(\sum_{i=1}^{N} m_i(x)\right) \tag{3}$$

where $\psi_m$ and $\psi_p$ are multilayer perceptrons (MLPs) with non-linear activation functions. The attention scores $\alpha_i$ learned by the model can be treated as patch importance scores and are used to interpret MIL models.

The inventors have recognized and appreciated that there are several limitations in doing spatial attribution using these attention scores. For example, consider the task of classifying a slide into benign, suspicious or malignant.

First, since the attention weights are used to scale the patch features used for the prediction task, a high attention weight only means that the patch might be needed for the prediction downstream. Therefore, a high attention score for a patch can be a necessary but not sufficient condition for attributing a prediction to that patch. Similarly, patches with low attention can be important for the downstream prediction since the attention scores are related non-linearly to the final classification or regression layer. For example, in a malignant slide, non-tumor regions might get highlighted by the attention scores since they need to be represented at the final classification layer to provide discriminative signal. However, this does not imply malignant prediction should be attributed to non-malignant regions, nor that these regions would be useful to guide a human expert.

Second, the contribution of a patch to the final prediction can be either positive (excitatory) or negative (inhibitory), however attention scores do not distinguish between the two. A patch might be providing strong negative evidence for a class but will be highlighted in the same way as a positive patch. For example, benign mimics of cancer are regions which visually look like cancer but are normal benign tissue. These regions are useful for the model to provide negative evidence for the presence of cancer and thus might have high attention scores. While attending to these regions may be useful to the model, they may complicate human interpretation of resulting heatmaps.

Third, attention scores do not provide meaningful information about the class-wise importance of a patch, but only that a patch was weighted by a certain magnitude for generating the prediction. In the case of multiclass classification, this becomes problematic as a high attention score on a patch can mean that it might be useful for any of the multiple classes. Different regions in the slide might be contributing to different classes which are indistinguishable in an attention heatmap. For example, if a patch has high attention weight for benign-suspicious-malignant classification, it can be interpreted as being important for any one or more of the classes. This makes the attention scores ineffective for verifying the role of individual patches for a slide-level prediction.

Fourth, using attention scores to assess patch contribution ignores patch interactions at the classification stage. For example, two different tumor patches might have moderate attention scores, but when taken together in the final classification layer, they might jointly provide strong and sufficient information for the slide being malignant. Thus, computing marginal patch contributions for a bag needs to be done at the classification layer and not the attention layer since attention scores do not capture patch interactions and thus can underestimate or overestimate contributions to the final prediction.

B. Additive MIL Models

These limitations in interpreting attention MIL heatmaps motivate the formulation of a traceable predictor function, where model predictions can be specified in terms of patch contributions (both positive and negative) for each class. The inventors have developed additive MIL models to address the aforementioned limitations. The inventors have recognized and appreciated that it is desirable that the approaches described herein be intrinsic to the model, as opposed to being post-hoc approaches. This prevents incorrect assumptions about the model without the need for post-hoc modeling. It also prevents many pitfalls of traditional saliency methods.

The inventors have further recognized and appreciated that it is desirable that attribution be performed in terms of instances only. For pathology, this means that the prediction should be attributed to individual patches. This constraint enables expression of bag predictions in terms of marginal instance contributions.

The inventors have further recognized and appreciated that it is desirable that the model be able to distinguish between excitatory and inhibitory patch contributions. Some models provide per-class contributions for classification problems. To enable the desired instance-level credit assignment in MIL, according to some embodiments, the final predictor is re-framed to be an additive function of individual instances. This can be expressed in accordance with the following example expression:

$$p_{Additive}(x) = \sum_{i=1}^{N} \psi_p(m_i(x)) \tag{4}$$

Making this change results in the final predictor only being able to implement patch-additive functions on top of arbitrarily complex patch representations. This provides both complexity of the learned representations as well as a traceable patch contribution for a given prediction, which solves the spatial credit assignment problem. The function $\psi_p(m_i(x))$ is the class-wise contribution for patch i in the bag. At inference, $\psi$ produces a $R^{CxN}$ for a classification problem where C is the number of classes and N is the number of patches in a bag. Thus, a class-wise score for each patch is obtained, which when summed gives the final logits for the prediction problem. These scores can be visualized by constructing a heatmap from the visual representation of patch-wise contributions for each class. The sign of the patch contribution determines whether the patch is excitatory or inhibitory towards each class since positive values add to the final logit while negative values bring down the final class logit.

Figure 10:
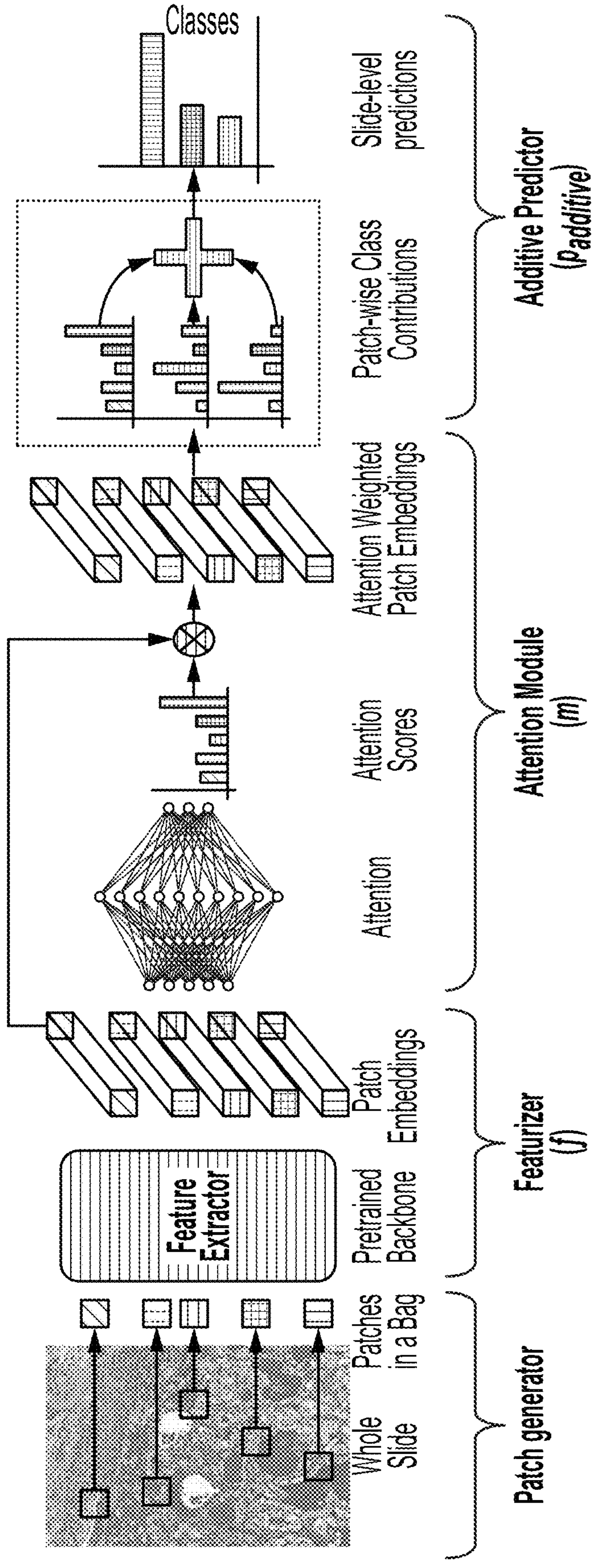
FIG. 10 is a block diagram illustrating an example of an additive multiple instance learning (MIL) model, in accordance with some embodiments.

FIG. 10 illustrates an example of an additive MIL model, in accordance with some embodiments. The model includes a patch generator, a featurizer (f), an attention module (m) and an additive predictor ($p_{additive}$). The patch generator is configured to generate a bag with a plurality of patches from an input image. Each patch includes a distinct portion of the input image. The featurizer includes a neural network (e.g., convolutional) model configured to generate a plurality of patch embeddings using at least a portion of the bag. In some embodiments, the featurizer may be a foundation model backbone. In some embodiments, the featurizer may be a foundation model backbone that has been pre-trained as described herein such as described with reference to FIGS. 1-4. In some embodiments, when the featurizer is a foundation model backbone, the featurizer may generate the patch embeddings as vector embeddings from the patches from the input image, as described herein. In some embodiments, the attention module and/or additive predictor may function as an adaptation head of a foundation model. The attention module is configured to determine an attention score for each of the plurality of patch embeddings. Further, the attention module generates a plurality of attention weighted patch embeddings by scaling the plurality of patch embeddings using the attention scores. The additive predictor is configured to aggregate the plurality of attention weighted patch embeddings to generate a plurality of patch-wise class contributions. Each patch-wise class contribution represents a contribution of a corresponding class. Further, the additive predictor computes a plurality of predictions from the patch-wise class contributions using an additive function. Optionally, a heatmap of the image may be generated. The heatmap may identifying patch-wise class contributions associated with each class, as described in detail further below.

It should be noted that a convolutional neural network is used as an example of a model that may be used in accordance with some embodiments. However, it should be appreciated that other types of statistical models may alternatively be used, and embodiments are not limited in this respect. Other types of statistical models that may be used include a support vector machine, a neural network, a regression model, a random forest, a clustering model, a Bayesian network, reinforcement learning, metric learning, a genetic algorithm, foundation models such as those described herein, or another suitable statistical model.

C. Aspects of the Additive MIL Model

Precise marginal patch contribution towards a prediction. Additive MIL models provide precise (e.g., exact) patch contribution scores which are additively related to the prediction. This additive coupling of the model and the interpretability method makes the spatial scores precisely mirror the invariances and the sensitivities of the model, thus making them intrinsically interpretable.

Class-wise contributions. Additive MIL models allow decomposing the patch contributions and attributing them to individual classes in a classification problem. This allows not only to assign the prediction to a region, but also to determine to which class it contributes. This is helpful in cases where signal for multiple classes exist within the same slide.

Distinction between excitatory and inhibitory contributions. Additive MIL models allow for both positive and negative contributions from a patch. This can help distinguish between areas which are important because they provide evidence for the prediction and those which provide evidence against.

D. Experiments and Results

Various experiments were performed to show the benefits of additive MIL models for interpretability in pathology problems. The experiments resulted in one or more of the following effects:

- Additive MIL models provide intrinsic spatial interpretability without material loss of predictive performance as compared to more expressive, non-additive models.
- Pooling-based MIL model can be made additive by reformulating the predictor function, leading to predictive results similar to the original model.
- Additive MIL heatmaps yield better alignment with region-annotations from an expert pathologist than attention MIL heatmaps.
- Additive MIL heatmaps provide more granular information like class-wise spatial assignment and excitatory and inhibitory patches which is missing in attention heatmaps. This can be useful for applications like model debugging.

Three different datasets and two different problems were considered in the experiments. The first problem is the prediction of cancer subtypes in non-small cell lung carcinoma (NSCLC) and renal cell carcinoma (RCC), both of which use the TCGA dataset. The second problem is the detection of metastasis in breast cancer using the Camelyon16 dataset. TCGA RCC contains 966 whole slide images (WSIs) with three histologic subtypes—KICH (chromophobe RCC), KIRC (clear cell RCC) and KIRP (papillary RCC). 768k patches were extracted from this dataset which translates to an average of 795 patches per slide and 16k total bags. TCGA NSCLC has 1002 WSIs, with 538 slides belonging to subtype LUAD (Lung Adenocarcinoma) and 464 to LUSC (Lung Squamous Cell Carcinoma). 1.465 million patches were extracted from this dataset which translates to an average of 1462 patches per slide and 30.5k total bags. Camelyon16 contains 267 WSIs for training and 129 for testing with a total of 159 malignant slides and 237 benign slides. 510k patches were extracted from this dataset which translates to an average of 1286 patches per slide and 10.6k total bags. These numbers point to the diversity in the dataset size in terms of number of slides, number of bags, and the label imbalance.

In some experiments, both TCGA datasets were split into 60/15/25 (train/val/test) while ensuring no data leakage at a case level. For Camelyon16, the original splits provided with the dataset were used. For training the models, a bag size of 48-1600 patches and batch size of 16-64 was experimented with and the best one chosen using cross-validation. The patches were sampled from non-background regions for all datasets at a resolution of 1 microns per pixel without any overlap between adjacent patches. An ImageNet pre-trained Shufflenet was used as the feature extractor and the entire model was trained with ADAM optimizer and a learning rate of $1e^{-4}$. For inference, multiple bag predictions were aggregated using a majority vote to get the final slide-level prediction. AUROC (area under the receiver operating curve) scores were generated using the proportion of bags predicting the majority label as the class assignment probability. For TCGA-RCC, macro average of 1-vs-rest AUROC was computed across the three classes. The attention scores were obtained by directly taking the raw outputs for each patch from the attention module. For additive patch contributions, the patch-wise class contributions were taken and converted to a bounded patch contribution value using a sigmoid function. This yielded excitatory scores in the range of 0.5-1 and inhibitory scores in the range of 0-0.5. Both the attention and additive patch-wise scores were used for generating a heatmap as an overlay on the slide with attention MIL heatmaps having a single value per patch and additive MIL heatmaps having C values per patch where C is the number of classes. All training and inference runs were done on Quadro RTX 8000, which took three to four hours to train using four GPUs.

E. Predictive Performance of Additive MIL Models

Additive MIL models were compared with existing techniques in terms of predictive performance on three different datasets. A mean-pooling based MIL baseline was implemented without any attention, the standard attention MIL model (ABMIL) and a transformer based MIL model, TransMIL which is the state-of-the-art, were tested on these three datasets.

In the case of improved performance, it was hypothesized that the additive constraint regularizes the model and limits overfitting in comparison to previous approaches. This is particularly relevant to pathology datasets that often have less than one thousand slides. Implementing the additive formulation gives nearly all the benefits of modeling complexity from previous methods, while enabling spatial interpretability without material loss of predictive performance.

FIG. 11 includes a table displaying results from comparing existing techniques with additive MIL models on the Camelyon16, TCGA NSCLC, and TCGA RCC data sets. The tested models include a Mean Pooling MIL model, a Mean Pooling MIL Model with an additive constraint, an Attention MIL Model, an Attention MIL Models with an additive constraint, a TransMIL model, and a TransMIL model with an additive constraint. As shown, the MIL models with additive constraints outperform or perform similarly to the existing techniques.

Heatmaps obtained through additive MIL models were compared with heatmaps obtained through attention MIL models. Both were evaluated against region-level annotations from an expert pathologist. The Camelyon16 dataset was used. The objective was to classify the slide as benign or malignant. Since the cancer foci are very localized and often occupy less than 1% of the slide, the task of generating localized cancer heatmaps in a weakly supervised setup is very challenging. Exhaustive segmentation annotations were obtained for cancer regions from a board-certified pathologist on the Camleyon16 test set. An additive MIL model was trained accordingly. Traditional attention heatmaps were generated using patch-level attention scores. Additive MIL heatmaps were generated using the patch contributions.

Figure 12A:
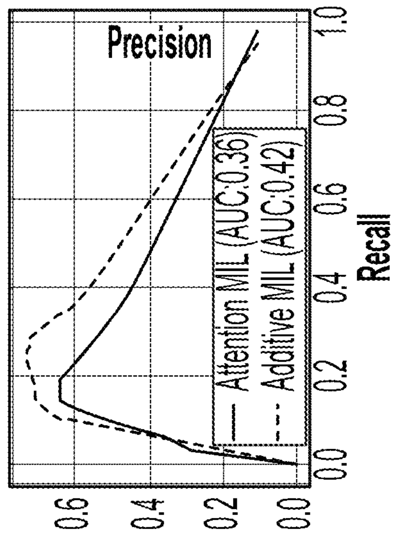
FIG. 12A provides a comparison between the precision of an attention MIL model and that of an additive model, in accordance with some embodiments.

FIG. 12A provides a comparison between the precision of an attention MIL model and that of an additive model, in accordance with one example. More specifically, FIG. 12A shows patch level precision-recall curves at different thresholds of the heatmap. It should be noted that this comparison controls for model performance as both heatmaps are generated from the same model. At low thresholds, nearly all patches are highlighted, and both methods present a high recall and low precision. As the threshold increased, precision is higher and recall is lower.

Figure 12B:
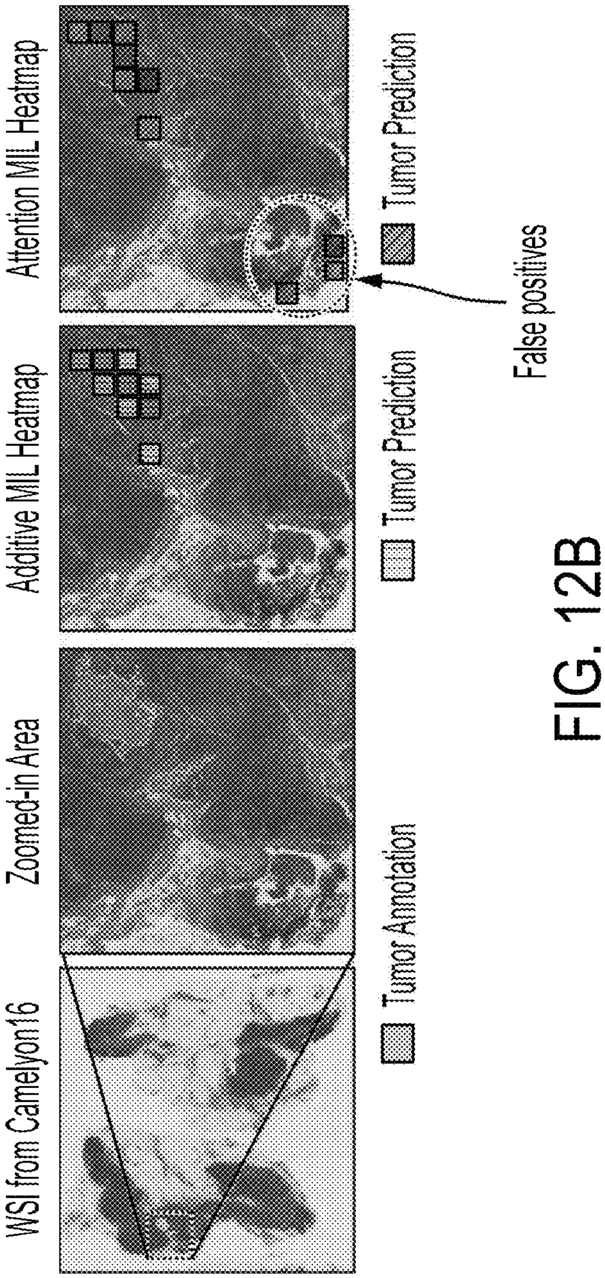
FIG. 12B provides a comparison between heatmaps generated using an additive MIL and an attention MIL, in accordance with some embodiments.

FIG. 12B provides a comparison between heatmaps generated using an additive MIL and an attention MIL, in accordance with one example. The additive MIL heatmaps (AUPRC 0.42) highlighted cancer regions more precisely and sensitively than traditional attention heatmaps (AUPRC 0.36), which detect more false-positives. If the best operating point of both of the curves is chosen, the result is that the best F1 score for the attention heatmap is 0.43 as compared to 0.47 from the additive heatmap. These experiments demonstrate the superior performance of additive MIL heatmaps in localizing areas of interest, at least in some circumstances.

Figure 13:
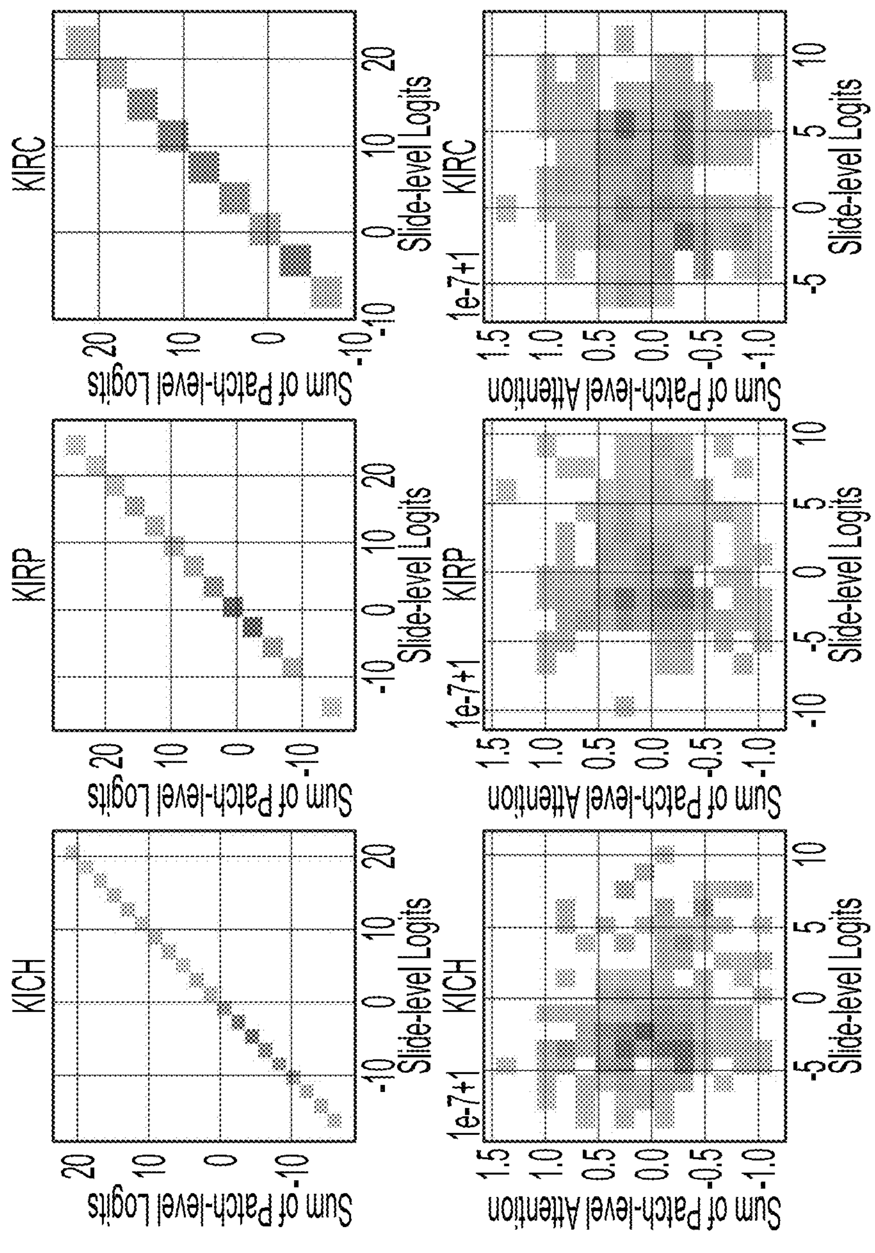
FIG. 13 shows the alignment between the slide-level predicted logits and patch contributions from the additive and the attention models on TCGA RCC, in accordance with some embodiments.

F. Faithful Representation of Patch-Level Contributions to Slide-Level Predictions Attention heatmaps are often used to signal regions of interest in a slide. However, as explained above, it is not straightforward to draw conclusions regarding the importance and contribution of attended areas towards the model prediction. Additive MIL guarantees that each patch's contribution is linear and thus faithfully represents its marginal contribution toward the slide-level prediction. This property is shown in FIG. 13, illustrating the alignment between the slide-level predicted logits and patch contributions from the additive and the attention models on TCGA RCC. In the top row, the Y-axis shows the sum of patch contribution in a bag for the additive MIL. In the bottom-row, the Y-axis shows the median score from top-10% patches in a bag for the attention MIL model. The columns represent the slide-level logits for each class. The colors represent the ground-truth. As can be appreciated, additive contributions are linear, while attention contributions are not (there is no clear relationship with the final predictions).

G. Qualitative Assessment of Multi-Class & Excitatory-Inhibitory Heatmaps

Figure 14A:
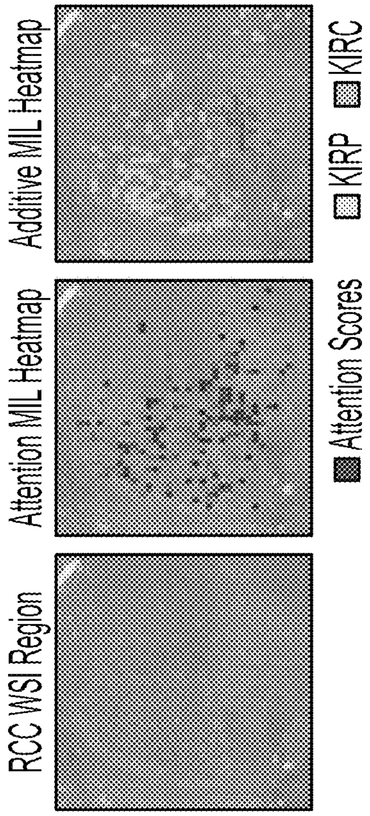
FIG. 14A shows a renal cell carcinoma (RCC) region, an attention heatmap identifying attention scores and an additive heatmap identifying KIRC regions and KIRP regions, in accordance with some embodiments.
Figure 14B:
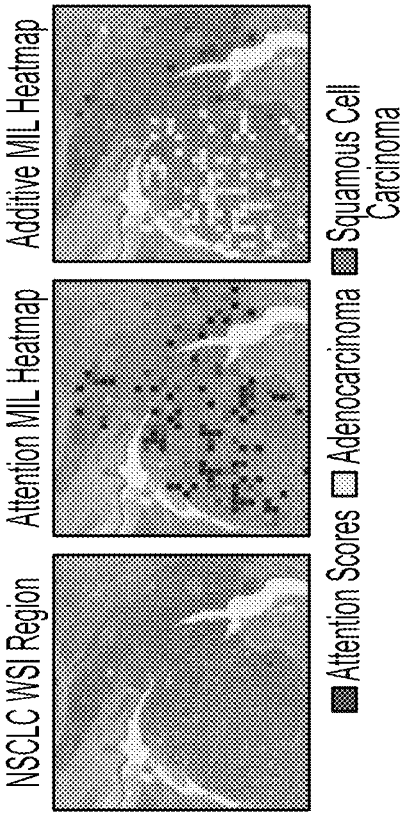
FIG. 14B shows a non-small cell lung cancer (NSCLC) region, an attention heatmap identifying attention scores and an additive heatmap identifying adenocarcinoma regions and squamous cell carcinoma regions, in accordance with some embodiments.

We highlight the benefits of having class-wise excitatory-inhibitory contributions for each spatial region in a slide. FIG. 14A shows a renal cell carcinoma (RCC) region (left), an attention heatmap identifying attention scores (center) and an additive heatmap identifying KIRC regions and KIRP regions (right). FIG. 14B shows a non-small cell lung cancer (NSCLC) region (left), an attention heatmap identifying attention scores (center) and an additive heatmap identifying adenocarcinoma regions and squamous cell carcinoma regions (right). In these examples, the attention heatmaps (heatmaps obtained using an attention MIL model) highlight tissue regions predictive of the cancer subtype, but do not provide information about the association of patches to classes. In contrast, the additive heatmaps (heatmaps obtained using an additive MIL model) show precisely how each patch contributes to each class, and in turn the final prediction. Thus, unlike attention heatmaps, additive heatmaps can visualize class-level information.

Figure 15:
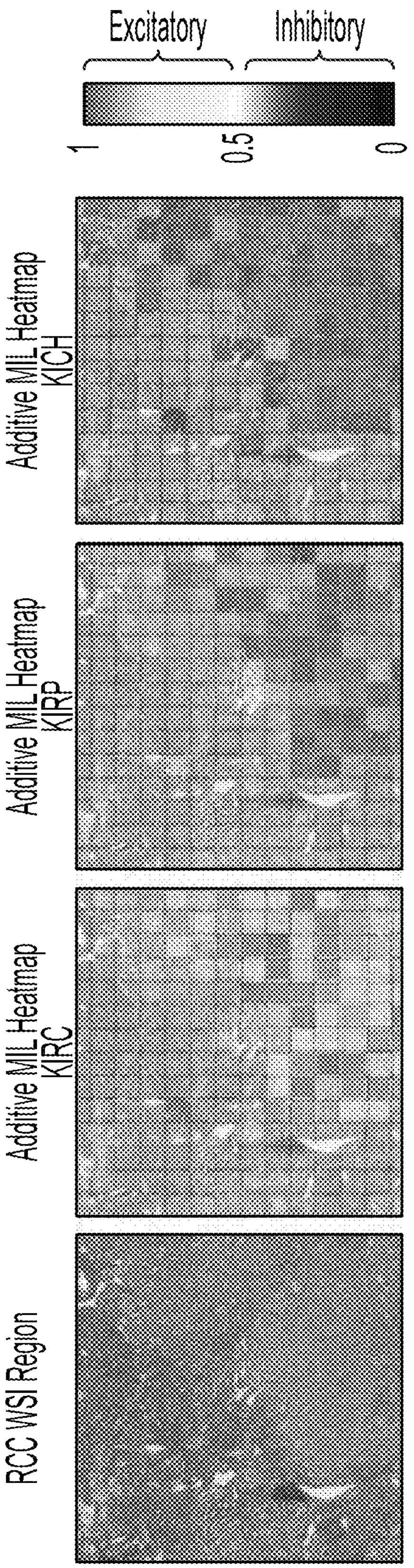
FIG. 15 shows a renal cell carcinoma (RCC) region, and additive heatmaps identifying KIRC regions, KIRP regions and KIRH regions, in accordance with some embodiments.

Further, additive MIL models are able to distinguish between excitatory and inhibitory patch contributions. FIG. 15 shows a renal cell carcinoma (RCC) region, and additive heatmaps identifying KIRC regions, KIRP regions and KIRH regions. The additive MIL heatmaps for each class are visualized by the same colorbar where red denotes excitatory patches and blue denotes inhibitory ones. The RCC WSI is labeled as KIRC, but the selected region contains two subtypes, namely KIRC and small regions of KIRP, as evident from the raw slide. The additive MIL heatmaps accurately show bottom right region being excitatory for KIRC, but inhibitory for the other two whereas the top left region is only excitatory for KIRP and inhibitory for two other two. All patches are correctly inhibitory for KICH. Such granularity in heatmaps is helpful in understanding how the model arrives at a prediction and can prove to be useful for practitioners building the models as well as physicians using them.

H. Model Debugging Using Additive MIL Heatmaps

Figure 16A:
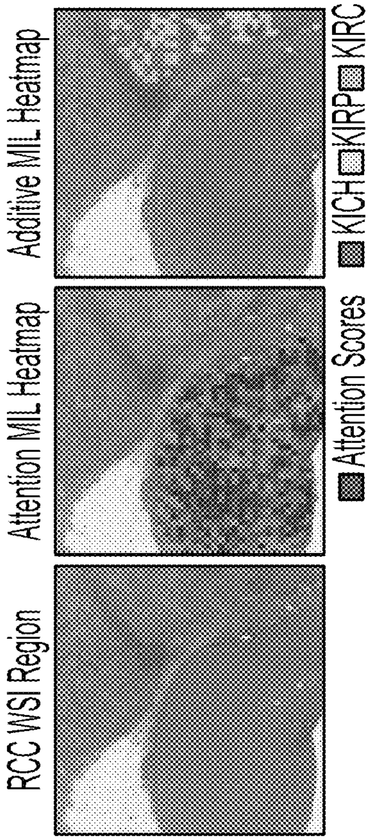
FIG. 16A shows an example of a model mis-predicting a KIRP slide as KICH, in accordance with some embodiments.
Figure 16B:
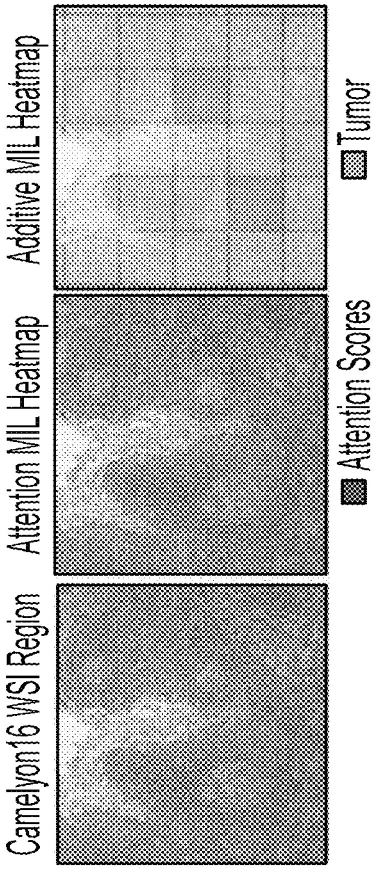
FIG. 16B shows an example of a Camelyon16 case where the model is mis-predicting a benign slide as malignant, in accordance with some embodiments.

The ability of additive MIL models to accurately reflect model predictions at a patch-level can be useful in model debugging. FIG. 16A shows an example of a model mis-predicting a KIRP slide as KICH. Attention heatmaps show a region of adrenal gland on the left being attended. Additive MIL heatmaps are able to exactly show how adrenal glands being rare, are being confused for KICH regions even though the model correctly identifies the KIRP regions on the right side. FIG. 16B shows an example of a Camelyon16 case where the model is mis-predicting a benign slide as malignant. The attention heatmap offers no information, however, additive MIL heatmap highlights areas of germinal center as the source of this false positive prediction (in red). This pattern for false positive prediction is found in multiple other slides and can enable to go from interpretation to debugging.

These heatmaps not only provide interpretability to MIL models, but can also aid in validating specific hypothesis during model debugging.

VII. Pathology Image Analysis Systems

Figure 17:
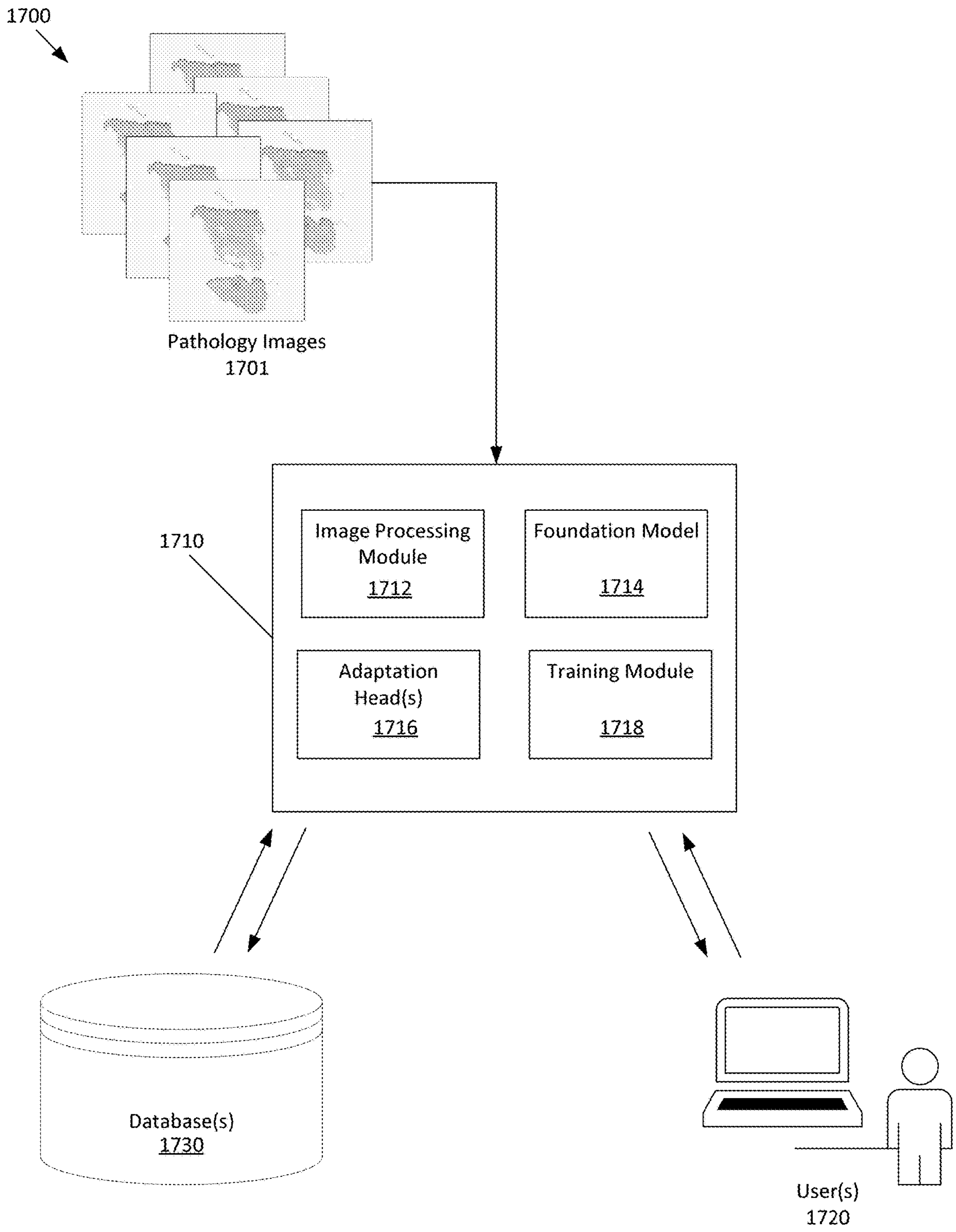
FIG. 17 is an example of an environment which a pathology image analysis system may be deployed, in accordance with some embodiments.

In some embodiments, the techniques described herein may be implemented in a pathology image analysis system. Such systems may be deployed within a healthcare environment such as environment 1700 of FIG. 17. Healthcare environments may span multiple locations such as hospitals, clinics, labs, doctor's offices, outpatient clinics, and/or patient homes among other locations related to the analysis of pathology images. Healthcare environments may be connected via one or more networks (e.g., computer networks, local area networks, wide area networks, virtual private networks, the internet, etc.).

As shown, environment 1700 includes pathology image processing system 1710, database(s) 1730, pathology images 1701, and user(s) 1720.

The pathology image processing system 1710 includes multiple modules for analyzing pathology images. The processing system 1710 may include one or more computer hardware processors for performing the functions described herein. The pathology image processing system 1710 includes an image processing module 1712, a foundation model 1714, adaptation head(s) 1716, and training module 1718.

The image processing module 1712 may perform one or more actions on the received pathology images 1701, for example filtering images, cropping images, grouping images, selecting images for analysis, segmenting images (e.g., tissue segmentation), etc. In some embodiments, image may not be processed. After processing the images may be passed to one or more other modules of the pathology image processing system, for example images may be passed to the foundation model 1714 and/or adaptation head(s) 1716 for analysis, images may be passed to the training module 1718 for pre-training the foundation model 1714 and/or training the adaptation head(s) 1716, or images may instead be passed to database(s) 1730 for storage.

The pathology image processing system 1710 additionally includes foundation model 1714. The foundation model 1714 may be pre-trained as described herein to generate embeddings from pathology images input to the pathology image processing system. For example, the foundation model 1714 may receive one or more of the pathology images 1701 to generate data embeddings for further processing. The data embeddings may be passed to one or more adaptation heads 1716 of the pathology image processing system to perform one or more tasks on the images, as described herein. In some embodiments, the adaptation heads 1716 may perform one or more of: slide-level identification of biological features, tissue-level identification of biological feature, cellular-level identification of biological features, and/or subcellular-level identification of biological features.

The pathology image processing system additionally includes training module 1718 which may facilitate pre-training, training and/or fine tuning of the foundation model 1714 and/or adaptation heads, as described herein. The training module 1714 may use pathology images 1701 in training, may use stored pathology images and/or training data from database(s) 1730, and/or obtain pathology images and/or training data from other sources.

The pathology image processing system 1710 is connected to one or more databases 1730. The one or more databases may be included within the pathology image processing system and/or may be accessible by the pathology image processing system 1710 (e.g., as cloud storage). The database(s) 1730 may be used for storing training images and data, processed images, outputs from the foundation model and/or adaptation heads, and/or parameters of the foundation model and/or adaptation heads, among other data relevant to or used by the pathology image processing system 1710.

The pathology images 1701 may be provided to the pathology image processing system 1710. The pathology images may be obtained from a laboratory such as a pathology laboratory and/or other medical source. The pathology images analyzed may be obtained by imaging sections of a tissue sample obtained from resection or biopsy. The samples may be stained for analysis, for example using a H&E or similar stain. The images may be obtained via a microscope, for example, images at 20× and/or 40× magnification. Images may be obtained using whole slide imaging scanners such as Aperio AT2, Aperio GT450, Hamamatsu S360, Philips UFS, or Ventana DP200, among other scanners. The images may be digital images stored in data structures, for example .bif(f), .isyntax, .mrxs, .ndpi, .sys, and/or .tif(f) files.

In some embodiments, pathology images 1701 are provided to the pathology image processing system 1710 for analysis. The pathology image analysis may process the images using one or more of the: image processing module 1712, foundation model 1714, and/or adaptation head(s) 1716, and provide outputs to one or more user devices 1720. The outputs may include the results of tasks performed by the adaptation heads, indications of one or more biological conditions present in the pathology images, and/or biological indications (e.g., predicted diagnoses) related to the results of the tasks performed by the adaptation heads and/or biological indications. The outputs may be provided to the user devices 1720 for display to the one or more users. The users may include pathologists, patients, and/or clinicians, among other medical professionals.

Figure 18A:
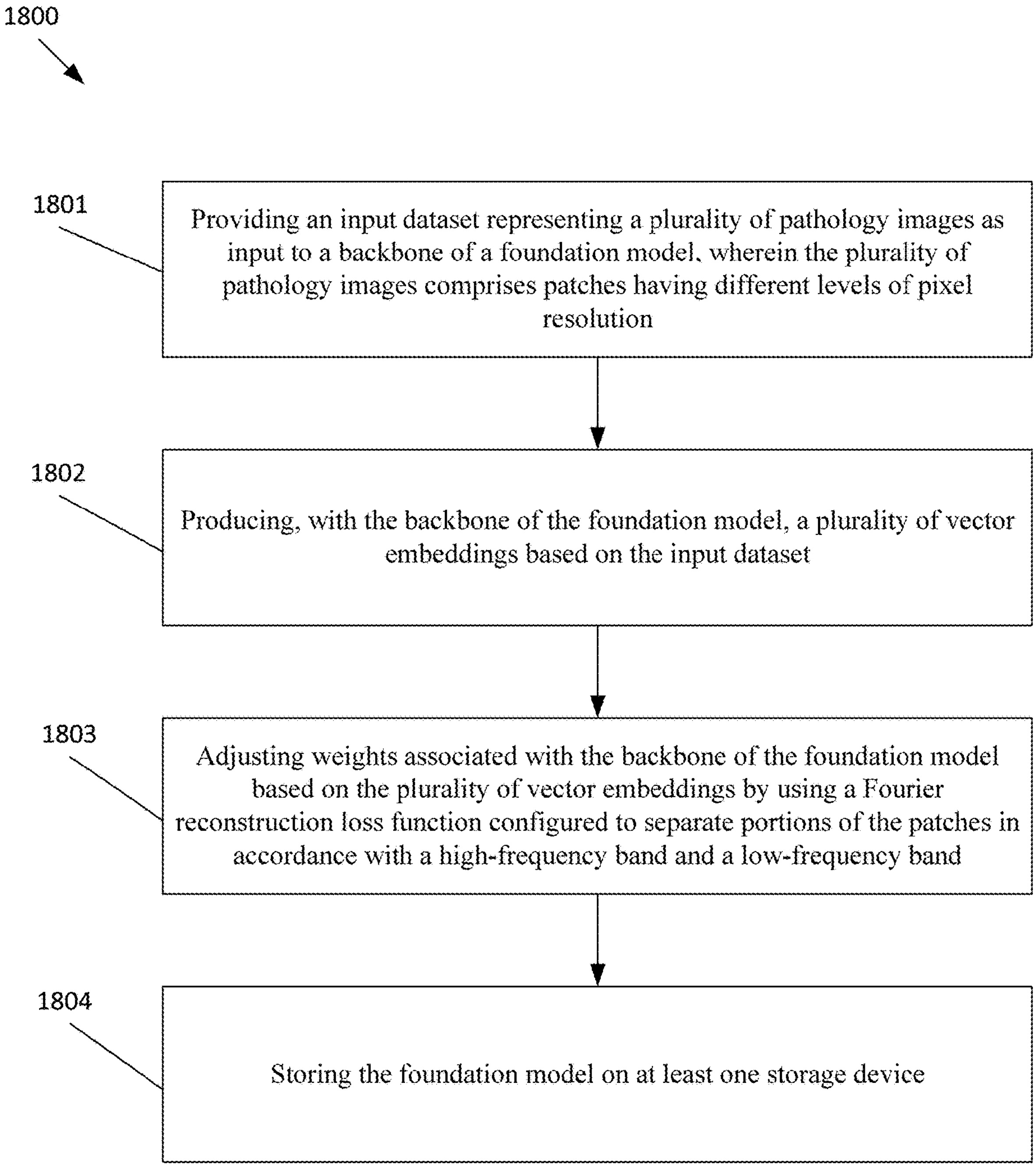
FIG. 18A is an example of a process which may be performed for pre-training a foundation model, in accordance with some embodiments.

FIG. 18A is an example of a process 1800 which may be performed for pre-training a foundation model, according to some embodiments of the technology described herein. In some embodiments, the process 1800 may be performed by a pathology image analysis system, for example system 1710 of FIG. 17.

Process 1800 begins with act 1801, in which an input dataset representing a plurality of pathology images is provided as input to a backbone of a foundation model, wherein the plurality of pathology image comprises patches having different levels of pixel resolution. In some embodiments, act 1801 may be performed by a training module of a pathology image analysis system, for example training module 1718 of FIG. 17. The input dataset may be a dataset as described herein, for example, as described with reference to FIG. 1. In some embodiments, the input dataset may include images from one or more tissue groups and disease areas, which capture a broad range of benign, malignant, and inflammatory lesions. In some embodiments, the input dataset may include images from multiple stain groups, for example: hematoxylin and eosin (H&E), formalin-fixed paraffin-embedded (FFPE), H&E frozen, IHC, and special stains. In some embodiments, the input dataset includes images having varying base objective magnifications, for example 20× and 40× slides. In some embodiments, the input dataset includes unlabeled images. In some embodiments, the input dataset includes labeled images. In some embodiments, the input dataset may include images from multiple different scanners.

Process 1800 then proceeds to act 1802, in which a plurality of vector embeddings are produced with the backbone of the foundation model based on the input dataset. The vector embeddings may be produced using the foundation model backbone as described herein, for example as described with reference to FIGS. 1-4.

Process 1800 then proceeds to act 1803, in which weights associated with the backbone of the foundation model are adjusted based on the plurality of vector embeddings by using a Fourier reconstruction loss function configured to separate portions of the patches in accordance with a high-frequency band and a low-frequency band. In some embodiments, weights may be adjusted as described herein, for example, as described with reference to FIGS. 1-4. In some embodiments, act 1803 may be performed using a training module of a pathology image analysis system, for example training module 1718 of FIG. 17.

Process 1800 then proceeds to act 1804, in which the foundation model is stored on at least one storage device. In some embodiments, the foundation model may be stored on one or more non-transitory computer readable storage devices and/or databases, such as database 1730 of FIG. 17.

Figure 18B:
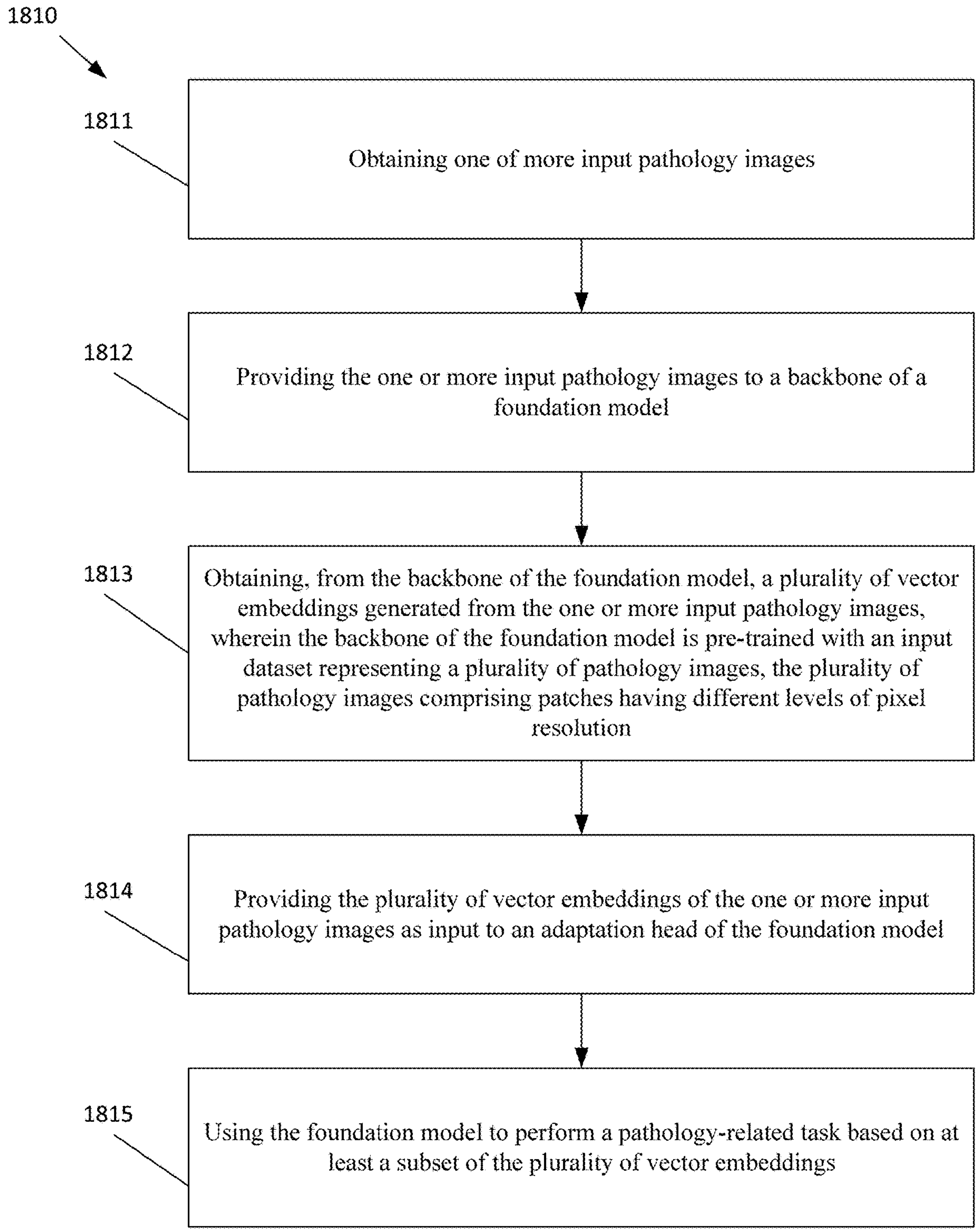
FIG. 18B is an example of a process 1810 which may be performed to perform a pathology-related task using a foundation model, in accordance with some embodiments.

FIG. 18B is an example of a process 1810 which may be performed to perform a pathology-related task using a foundation model, according to some embodiments of the technology described herein. In some embodiments, the process 1810 may be performed by a pathology image analysis system, for example system 1710 of FIG. 17.

Process 1810 begins with act 1811, in which one or more input pathology images are obtained. In some embodiments, the one or more input pathology images may be obtained from one or more sources, for example, a laboratory, a pathology laboratory, and/or other medical settings. In some embodiments, the one or more input pathology images may be obtained from storage, e.g., databases connected to a pathology image analysis system.

Process 1810 the proceeds to act 1812, in which the one or more input pathology images are provided to a backbone of a foundation model.

Process 1810 then proceeds to act 1813, in which a plurality of vector embeddings are obtained from the backbone of the model. The plurality of vector embeddings are generated from the one or more input pathology images and the backbone of the foundation model is pre-trained with an input dataset representing a plurality of pathology images, the plurality of pathology images comprising patches having different levels of pixel resolution. In some embodiments, the vector embeddings may be generated as described herein, for example with reference to FIGS. 3-6. In some embodiments, the backbone of the foundation model may be pre-trained as described herein, for example as described with reference to FIGS. 1-4.

Process 1810 then proceeds to act 1814, in which the plurality of vector embeddings of the one or more input pathology images are provided as input to an adaptation head of the foundation model. In some embodiments, the adaptation head may be trained, as described herein, for example as described with reference to FIGS. 3-16B.

Process 1810 then proceeds to act 1815, in which the foundation model is used to perform a pathology related task based on at least a subset of the plurality of the vector embeddings. In some embodiments, the pathology related task may be performed using the adaptation head of the foundation model, for example by processing at least the subset of the plurality of vector embeddings using the adaptation head. In some embodiments, the pathology related tasks include tasks as described herein, for example with reference to FIGS. 3-16B. In some embodiments, the pathology related task includes one or more of: slide-level identification of biological features, tissue-level identification of biological feature, cellular-level identification of biological features, and/or subcellular-level identification of biological features, among other pathology-related tasks.

VIII. Exemplary Computer Environment

Figure 19:
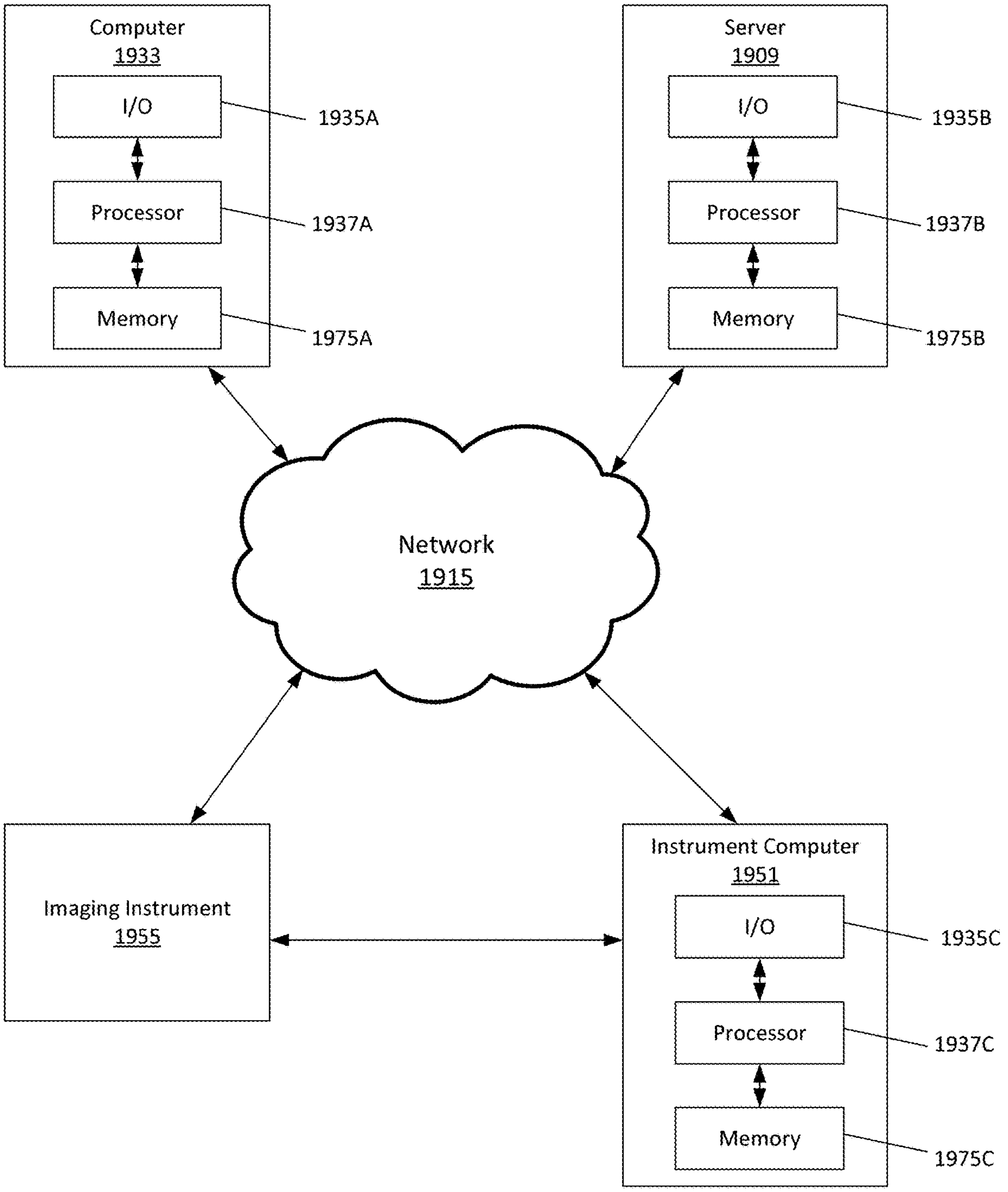
FIG. 19 shows a block diagram of an exemplary computing device, in accordance with some embodiments.

FIG. 19 shows a block diagram of a computer system on which various embodiments of the technology described herein may be practiced. The system includes at least one computer 1933. Optionally, the system may further include one or more of a server computer 1909 and an imaging instrument 1955 (e.g., one of the instruments described above which may be used in capturing pathology images), which may be coupled to an instrument computer 1951. Each computer in the system, computer 1933, server 1909 and instrument computer 1951, includes a respective processor 1937A, 1937B and 1937C coupled to a respective tangible, non-transitory memory device 1975A, 1975B, and 1975C and at least one respective input/output device 1935A, 1935B and 1935C. Thus, the system includes at least one processor coupled to a memory subsystem (e.g., a memory device or collection of memory devices). In some embodiments, the memory devices, 1975A, 1975B, 1975C, may be separate memory devices. In some embodiments, the memory devices, 1975A, 1975B, 1975C, may be a single memory device. The components (e.g., computer, server, instrument computer, and imaging instrument) may be in communication over a network 1915 that may be wired or wireless and wherein the components may be remotely located or located in close proximity to each other. Using those components, the system is operable to receive or obtain image data such as whole-slide images, pathology images, histology images, or tissue images and annotation and score data as well as test sample images generated by the imaging instrument or otherwise obtained. In certain embodiments, the system uses the memory to store the received data as well as the model data which may be trained and otherwise operated by the processor.

In some embodiments, some or all of the system is implemented in a cloud-based architecture. The cloud-based architecture may offer on-demand access to a shared pool of configurable computing resources (e.g. processors, graphics processors, memory, disk storage, network bandwidth, and other suitable resources). A processor in the cloud-based architecture may be operable to receive or obtain training data such as whole-slide images, pathology images, histology images, or tissue images and annotation and score data as well as test sample images generated by the imaging instrument or otherwise obtained. A memory in the cloud-based architecture may store the received data as well as the model data which may be trained and otherwise operated by the processor. In some embodiments, the cloud-based architecture may provide a graphics processor for training the model in a faster and more efficient manner compared to a conventional processor.

Processor refers to any device or system of devices that performs processing operations. A processor will generally include a chip, such as a single core or multi-core chip (e.g., 12 cores), to provide a central processing unit (CPU). In certain embodiments, a processor may be a graphics processing unit (GPU) such as an NVidia Tesla K80 graphics card from NVIDIA Corporation (Santa Clara, CA). A processor may be provided by a chip from Intel or AMD. A processor may be any suitable processor such as the microprocessor sold under the trademark XEON E5-2620 v3 by Intel (Santa Clara, CA) or the microprocessor sold under the trademark OPTERON 6200 by AMD (Sunnyvale, CA). Computer systems may include multiple processors including CPUs and or GPUs that may perform different steps of the described methods. The memory subsystem may contain one or any combination of memory devices (e.g., memory devices 1975A, 1975B, 1975C). A memory device is a mechanical device that stores data or instructions in a machine-readable format. Memory may include one or more sets of instructions (e.g., software) which, when executed by one or more of the processors of the disclosed computers can accomplish some or all of the methods or functions described herein. Each computer may include a non-transitory memory device such as a solid state drive, flash drive, disk drive, hard drive, subscriber identity module (SIM) card, secure digital card (SD card), micro SD card, or solid state drive (SSD), optical and magnetic media, others, or a combination thereof. Using the described components, the system is operable to produce a report and provide the report to a user via an input/output device. An input/output device is a mechanism or system for transferring data into or out of a computer. Exemplary input/output devices include a video display unit (e.g., a liquid crystal display (LCD) or a cathode ray tube (CRT)), a printer, an alphanumeric input device (e.g., a keyboard), a cursor control device (e.g., a mouse), a disk drive unit, a speaker, a touchscreen, an accelerometer, a microphone, a cellular radio frequency antenna, and a network interface device, which can be, for example, a network interface card (NIC), Wi-Fi card, or cellular modem.

IX. Conclusion

It is to be appreciated that embodiments of the methods and apparatuses discussed herein are not limited in application to the details of construction and the arrangement of components set forth in the present disclosure or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, or ordinary meanings of the defined terms.

The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

As referred to herein, the term "in response to" may refer to initiated as a result of or caused by. In a first example, a first action being performed in response to a second action may include interstitial steps between the first action and the second action. In a second example, a first action being performed in response to a second action may not include interstitial steps between the first action and the second action.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In this application, unless otherwise clear from context, (i) the term "a" means "one or more"; (ii) the term "or" is used to mean "and/or" unless explicitly indicated to refer to alternatives only or the alternative are mutually exclusive, although the disclosure supports a definition that refers to only alternatives and "and/or"; (iii) the terms "comprising" and "including" are understood to encompass itemized components or steps whether presented by themselves or together with one or more additional components or steps; and (iv) where ranges are provided, endpoints are included.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having the same name (but for use of the ordinal term).

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the systems and methods described herein. Accordingly, the foregoing description and drawings are by way of example only.

What is claimed is:

1. A method for training a foundation model for use in pathology, the method comprising:

using a computer hardware processor to perform:

providing an input dataset representing a plurality of pathology images as input to a backbone of the foundation model, wherein the plurality of pathology images comprises patches having different levels of pixel resolution;

producing, with the backbone of the foundation model, a plurality of vector embeddings based on the input dataset;

adjusting weights associated with the backbone of the foundation model based on the plurality of vector embeddings by using a Fourier reconstruction loss function configured to separate portions of the patches in accordance with a high-frequency band and a low-frequency band; and storing the foundation model on at least one storage device.

2. The method of claim 1, wherein the plurality of pathology images are unlabeled such that training the foundation model is performed in an unsupervised fashion.

3. The method of claim 1, wherein the patches have at least first and second levels of pixel resolution, wherein:

the first level of pixel resolution is between 0.25 microns per pixel (mpp) and 1 mpp, and the second level of pixel resolution is between 1 mpp and 2 mpp.

4. At least one non-transitory computer-readable storage medium, storing processor executable instructions, that when executed by at least one computer hardware processor cause the processor to perform a method for training a foundation model for use in pathology, the method comprising:

providing an input dataset representing a plurality of pathology images as input to a backbone of the foundation model, wherein the plurality of pathology images comprises patches having different levels of pixel resolution;

producing, with the backbone of the foundation model, a plurality of vector embeddings based on the input dataset;

adjusting weights associated with the backbone of the foundation model based on the plurality of vector embeddings by using a Fourier reconstruction loss function configured to separate portions of the patches in accordance with a high-frequency band and a low-frequency band; and storing the foundation model on at least one storage device.

5. The at least one non-transitory computer-readable storage medium of claim 4, wherein the plurality of pathology images are unlabeled such that training the foundation model is performed in an unsupervised fashion.

6. The at least one non-transitory computer-readable storage medium of claim 4, storing further instructions that cause the at least one computer hardware processor to perform:

fine-tuning an adaptation head of the foundational model, to perform one or more of: slide-level identification of biological features, tissue-level identification of biological feature, cellular-level identification of biological features, and/or subcellular-level identification of biological features, the fine-tuning comprising:

inputting a fine-tuning dataset comprising a plurality of pathology images to the backbone; and fine-tuning the adaptation head using vector embeddings generated by the backbone using the fine-tuning dataset.

7. A system comprising:

a computer hardware processor; and at least one non-transitory computer-readable storage medium, storing processor executable instructions, that when executed by the at least one computer hardware processor cause the processor to perform a method for training a foundation model for use in pathology, the method comprising:

providing an input dataset representing a plurality of pathology images as input to a backbone of the foundation model, wherein the plurality of pathology images comprises patches having different levels of pixel resolution;

producing, with the backbone of the foundation model, a plurality of vector embeddings based on the input dataset;

adjusting weights associated with the backbone of the foundation model based on the plurality of vector embeddings by using a Fourier reconstruction loss function configured to separate portions of the patches in accordance with a high-frequency band and a low-frequency band; and storing the foundation model on at least one storage device.

* * * * *